United States Patent
Trépanier et al.

(10) Patent No.: US 12,432,319 B2
(45) Date of Patent: Sep. 30, 2025

(54) SYSTEM FOR ASSOCIATING A DIGITAL MAP WITH A VIDEO FEED, AND METHOD OF USE THEREOF

(71) Applicant: GENETEC INC., St-Laurent (CA)

(72) Inventors: Jean-David Trépanier, St-Hubert (CA); Mathieu Brault, Saint-Basile-le-Grand (CA)

(*) Notice: Subject to any disclaimer, the term of this patent is extended or adjusted under 35 U.S.C. 154(b) by 0 days.

(21) Appl. No.: 18/050,008

(22) Filed: Oct. 26, 2022

(65) Prior Publication Data

US 2023/0127421 A1 Apr. 27, 2023

Related U.S. Application Data

(63) Continuation-in-part of application No. 29/836,569, filed on Apr. 27, 2022, and a continuation-in-part of application No. 29/813,397, filed on Oct. 28, 2021.

(30) Foreign Application Priority Data

Oct. 27, 2021 (WO) ................ PCT/CA2021/051514

(51) Int. Cl.
*G06F 3/048* (2013.01)
*G06F 3/04817* (2022.01)
(Continued)

(52) U.S. Cl.
CPC ......... *H04N 7/183* (2013.01); *G06F 3/04817* (2013.01); *G11B 27/102* (2013.01); *G11B 27/34* (2013.01); *G06F 2203/04803* (2013.01)

(58) Field of Classification Search
None
See application file for complete search history.

(56) References Cited

U.S. PATENT DOCUMENTS 9,972,181 B1 * 5/2018 Baldwin .......... G08B 13/19691
11,074,460 B1 * 7/2021 Hodges ............... G06F 3/04855
(Continued)

FOREIGN PATENT DOCUMENTS

JP 2010272908 A 12/2010

OTHER PUBLICATIONS

International application No. PCT/CA2021/051514 International Search Report dated Jul. 25, 2022.
(Continued)

*Primary Examiner* — Thanh T Vu
(74) *Attorney, Agent, or Firm* — Anglehart et al.

(57) ABSTRACT

A method of rendering a digital map from an input within a graphical user interface element displayed in association with a video feed on a graphical user interface; it includes receiving a video feed; rendering the video feed and a video progress indicator on a graphical user interface; displaying, a first graphical user interface element indicative of an occurrence of an event, the event associated with a geographical location; rendering on the graphical user interface a digital map; displaying in correspondence with the time of the occurrence of the event on the digital map a second graphical user interface element, the second graphical user interface element comprising a second event indicator associated with the event type, the second graphical user interface element displayed at a position on the digital map corresponding to the geographical location associated with the event.

26 Claims, 35 Drawing Sheets

(51) Int. Cl.
*G11B 27/10* (2006.01)
*G11B 27/34* (2006.01)
*H04N 7/18* (2006.01)

(56) References Cited

U.S. PATENT DOCUMENTS

| | | | |
|---|---|---|---|
| 11,494,729 B1* | 11/2022 | Guan | G08B 13/19613 |
| 2011/0271236 A1 | 11/2011 | Jain | |
| 2016/0314355 A1* | 10/2016 | Laska | G06F 3/048 |
| 2018/0012462 A1 | 1/2018 | Heitz et al. | |
| 2019/0361577 A1 | 11/2019 | Burns et al. | |
| 2020/0143843 A1* | 5/2020 | Luo | G06V 20/52 |
| 2020/0258360 A1* | 8/2020 | Morris | H04N 7/183 |
| 2022/0050911 A1* | 2/2022 | Evans | G05B 15/02 |

OTHER PUBLICATIONS

International application No. PCT/CA2021/051514 Search Strategy dated Jul. 25, 2022.
International application No. PCT/CA2021/051514 Written Opinion of the International Searching Authority dated Jul. 25, 2022.

\* cited by examiner

SYSTEM FOR ASSOCIATING A DIGITAL MAP WITH A VIDEO FEED, AND METHOD OF USE THEREOF

CROSS-REFERENCE TO RELATED APPLICATIONS

The present application claims priority from U.S. design patent application No. 29/813,397 filed on Oct. 28, 2021, incorporated herein by reference. The present application claims priority from U.S. design patent application No. 29/836,569 filed on Apr. 27, 2022, incorporated herein by reference. The present application also claims priority from International PCT patent application No. PCT/CA2021/051514 filed on Oct. 27, 2021, incorporated herein by reference.

TECHNICAL FIELD

The present disclosure relates to video surveillance, and more particularly to graphical user interfaces for displaying surveillance information.

BACKGROUND

A video surveillance system may have a number of cameras connected to a server for the purposes of transmitting video data to the server. The server may archive the video data, manage and control the cameras, process the video data to perform video analytics, provide access to camera video feeds, for example, to one or more remote workstations or mobile devices for live monitoring or previously recorded viewing of the video feeds.

A user may connect to the server with a desktop application to view the video feeds when the server is an on-premises server. For example, a user may use the Genetec™ Security Desk application to connect to a server running Genetec™ Security Center unified security platform. Similarly, a user may connect to the server with a web application or web browser, for example, when the server is a cloud computing environment. For example, a user may use a web browser to connect to the Stratocast™ cloud-based video management system. While existing on-premises and cloud-based systems can vary in functionality between each other and these systems can also vary in features from version or release, these existing systems commonly provide a graphical user interface (GUI) on a user's computing device that displays one or more video tiles of video feeds, a video timeline for each video tile, and various inputs and/or controls.

Conventionally, these existing systems may detect motion based on image processing of the video feed and may be configured to add a bookmark to a video timeline to indicate motion, among other things that may be detected by these systems. Bookmarks may also be added by users to indicate a note or a tag in the video at a specific time.

Against this background, there remains a need to provide improvements to existing systems that provide video playback for improved display of information in GUIs in order to more readily alert or notify users of pertinent information pertaining to the video feed(s) being displayed.

SUMMARY

More particularly, alerting users with geographical location information of an event can improve surveillance of a geographical area, by providing the user with the necessary information to perform actions related to the geographical location information, such as dispatch enforcement officers, identify patterns of events in the geographical area, etc.

However, a challenge exists in allocating space on a graphical user interface to display the video feed and a digital map with location information relevant to a particular event.

The present disclosure relates to systems and methods of allocating space on a graphical user interface for displaying information related to an event of interest to a user, namely a video feed related to the event of interest and a geographical location of the event of interest, for enabling the user to receive additional context on the event of interest.

The methods and systems enable the display of geographical location information of the event through the use of a digital map or time information of the event from use of a video feed, and the transition to the other of the digital map or the video feed. A graphical user interface element includes an event indicator corresponding to the event that is common between the digital map and the video feed for marking a time and geographical location of the event.

The graphical user interface element provides the user with a visual queue regarding a location on the digital map corresponding to the geographical location of the event, and a visual queue for a moment or period of time (e.g. timestamp) in the video feed corresponding to the time of the event. Selection input received within a graphical user interface element displayed on either the digital map or the video feed (or with the video progress indicator) triggers a transition towards the other of the digital map or the video feed.

A broad aspect is a method of rendering a digital map within a graphical user interface displayed in association with a video feed. The method includes receiving a video feed comprising a plurality of image frames captured by a camera; rendering the video feed and a video progress indictor associated with the video feed on a graphical user interface displayed on a display device of a computing device; displaying, on at least one of the video feed and the video progress indicator, a first graphical user interface element indicative of an occurrence of an event, the first graphical user interface element displayed in correspondence with a time of the occurrence of the event, the first graphical user interface element comprising a first event indicator indicative of an event type associated with the event, the event associated with a geographical location; rendering, on the graphical user interface by the computing device the digital map; and displaying in correspondence with the time of the occurrence of the event on the digital map a second graphical user interface element, the second graphical user interface element comprising a second event indicator associated with the event type, the second graphical user interface element displayed at a position on the digital map corresponding to the geographical location associated with the event.

In some embodiments, the method may include receiving an input within the first user interface element while the first user interface element is displayed on at least one of the video feed and the video progress indicator and displaying the digital map with the second graphical user interface element in response to receiving the input within the first user interface element.

In some embodiments, the method may include the input is a first input, and the method may include receiving a second input within the second graphical user interface element displayed on the digital map; and following the second input being received, displaying the video feed by the computing device on the graphical user interface appearing on the display device to playback the video stream at the time of the occurrence of the event.

In some embodiments, the method may include receiving an input within the second user interface element while the second user interface element is displayed on the digital map and displaying the video feed and the video progress indicator associated with the video feed in response to receiving the input within the second user interface element.

In some embodiments, the input may be a first input, and the method may include receiving a second input within the first graphical user interface element; and following the second input being received, displaying, on the graphical user interface generated on the display device of the computing device, the digital map and the second graphical user interface element.

In some embodiments, the method may include rendering, on the graphical user interface by the computing device, a third graphical user interface element on the digital map, the third graphical user interface element indicative of the camera (also referred to herein as a camera graphical user interface element), the second graphical user interface element and the third graphical user interface element positioned on the digital map to indicate the positional relationship between the camera corresponding to the video feed and the occurrence of the event.

In some embodiments, the input may be a first input, and the method may include receiving a second input of the third graphical user interface element appearing on the digital map; receiving the video feed of the camera associated with the third graphical user interface element; and displaying, on the graphical user interface generated on the display device of the computing device, a live video feed of the camera associated with the third graphical user interface element.

In some embodiments, the third graphical user interface element may be an icon of a camera.

In some embodiments, the video feed may be displayed in a first region of the graphical user interface; and the video progress indicator may appear in a second region of the graphical user interface, and wherein the digital map may be rendered in a first sub-region of the first region, wherein the first sub-region may be smaller than the first region.

In some embodiments, the video feed may be displayed in a first region of the graphical user interface; and the video progress indicator may appear in a second region of the graphical user interface, and wherein the digital map may be displayed in a third region of the graphical user interface separate from the first region and the second region.

In some embodiments, the video feed may be displayed in a first region of the graphical user interface; and the video progress indicator appears in a second region of the graphical user interface, and wherein the digital map occupies at least the first region and the second region, and the video feed and the video progress indicator are occluded by the digital map.

In some embodiments, the first event indicator of the first graphical user interface element may appear on the video progress indicator at a position of the video progress indicator corresponding to the time of the occurrence of the event.

In some embodiments, the first graphical user interface element may be a pop-up element occupying at least in part a portion of the first region of the graphical user interface, the pop-up element displayed in correspondence with the time of the occurrence of the event.

In some embodiments, the input may include hovering over the first graphical user interface element with a cursor of an input device.

In some embodiments, the input may include a button press selection of the first user interface element via an input device.

In some embodiments, the first graphical user interface element may consist of the first event indicator.

In some embodiments, the first event indicator and the second event indicator may be an icon that is a graphical representation of the event type.

In some embodiments, the method may include identifying, from a plurality of event types, the event type associated with the event and choosing from a list of options the icon based on the event type as identified.

In some embodiments, when a plurality of graphical user interface elements appears with respect to a video feed, the method may include filtering the plurality of graphical user interface elements based on a filter parameter.

In some embodiments, the filter parameter may be an event type.

In some embodiments, the geographical location may be a location of the occurrence of the event.

In some embodiments, the geographical location may be a location of the camera that captured the plurality of image frames of the video feed.

In some embodiments, the graphical user interface element may correspond to an event with a geographical location within a predetermined range from a geographical location of a camera that is a source of the video feed displayed on the graphical user interface.

In some embodiments, the video feed may be a recorded video feed, and wherein the first graphical user interface element may be displayed in response to detecting that the time of the occurrence of the event is within a pre-determined timeframe of a current playback time of the recorded video feed.

In some embodiments, the video feed may be a live video feed, and wherein the first graphical user interface element may be displayed in response to detecting, in real-time and based on an event occurrence record being obtained from a data source, the occurrence of the event.

In some embodiments, the first graphical user interface element and the second graphical user interface element may be displayed at a same time on the graphical user interface corresponding to the time of the occurrence of the event.

In some embodiments, one of the first graphical user interface element and the second graphical user interface element may be displayed before the other of the first graphical user interface element and the second graphical user interface element, and wherein a period during which the first graphical user interface element is displayed may overlap with a period during which the second graphical user interface element is displayed, wherein the period during which the first graphical user interface element is displayed and the period during which the second graphical user interface element is displayed may correspond to the time of the occurrence of the event.

In some embodiments, the first graphical user interface element and the second graphical user interface element may be displayed at a predetermined time prior to the time of the occurrence of the event.

In some embodiments, the method may include removing the first graphical user interface element and the second graphical user interface element following a lapse of a predetermined time from the time of the occurrence of the event.

In some embodiments, the first event indicator may be the same as the second event indicator.

In some embodiments, the method may include receiving an input within a third user interface element indicative of a camera and appearing on the digital map, and displaying the video feed and the video progress indicator associated with the video feed in response to receiving the input within the third user interface element.

Another broad aspect is a system for rendering a digital map within a graphical user interface displayed in association with a video feed. The system includes a processor; and memory further including program code that, when executed by the processor, causes the processor to: receive a video feed comprising a plurality of image frames captured by a camera; render the video feed and a video progress indictor associated with the video feed on a graphical user interface; display, on at least one of the video feed and the video progress indicator, a first graphical user interface element indicative of an occurrence of an event, the first graphical user interface element displayed in correspondence with a time of the occurrence of the event, the first graphical user interface element comprising a first event indicator indicative of an event type associated with the event, the event associated with a geographical location; render, on the graphical user interface, the digital map; display in correspondence with the time of the occurrence of the event on the digital map a second graphical user interface element, the second graphical user interface element comprising a second event indicator associated with the event type, the second graphical user interface element displayed at a position on the digital map corresponding to the geographical location associated with the event.

In some embodiments, the program code may further cause the processor to receive an input within the first user interface element while the first user interface element is displayed on at least one of the video feed and the video progress indicator and displaying the digital map with the second graphical user interface element in response to receiving the input within the first user interface element.

In some embodiments, the input may be a first input, and the program code may further cause the processor to receive a second input within the second graphical user interface element displayed on the digital map; and following the second input being received, display the video feed on the graphical user interface appearing on the display device to playback the video stream at the time of the occurrence of the event.

In some embodiments, the program code may further cause the processor to receive an input within the second user interface element while the second user interface element is displayed on the digital map and displaying the video feed and the video progress indicator associated with the video feed in response to receiving the input within the second user interface element.

In some embodiments, the input may be a first input, wherein the program code may further cause the processor to receive a second input within the first graphical user interface element; and following the second input being received, display, on the graphical user interface, the digital map and the second graphical user interface element.

In some embodiments, the program code may further cause the processor to render, on the graphical user interface, the third graphical user interface element indicative of the camera, the second graphical user interface element and the third graphical user interface element positioned on the digital map to indicate the positional relationship between the camera corresponding to the video feed and the occurrence of the event.

In some embodiments, the input may be a first input, and the program code may further cause the processor to receive a second input of the camera graphical user interface element appearing on the digital map; receive the video feed of the camera associated with the camera graphical user interface element; and display, on the graphical user interface generated on the display device of the computing device, a live video feed of the camera associated with the camera graphical user interface element.

In some embodiments, the third graphical user interface element may be an icon of a camera.

In some embodiments, the video feed may be displayed in a first region of the graphical user interface; and the video progress indicator appears in a second region of the graphical user interface, and wherein the digital map is rendered in a first sub-region of the first region, wherein the first sub-region is smaller than the first region.

In some embodiments, the video feed may be displayed in a first region of the graphical user interface; and the video progress indicator may appear in a second region of the graphical user interface, and wherein the digital map may be displayed in a third region of the graphical user interface separate from the first region and the second region.

In some embodiments, the video feed may be displayed in a first region of the graphical user interface; and the video progress indicator may appear in a second region of the graphical user interface, and wherein the digital map may occupy at least the first region and the second region, and the video feed and the video progress indicator may be occluded by the digital map.

In some embodiments, the first event indicator of the first graphical user interface element may appear on the video progress indicator at a position of the video progress indicator corresponding to the time of the occurrence of the event.

In some embodiments, the first graphical user interface element may be a pop-up element occupying at least in part a portion of the first region of the graphical user interface, the pop-up element displayed in correspondence with the time of the occurrence of the event.

In some embodiments, the input may include hovering over the first graphical user interface element with a cursor of an input device.

In some embodiments, the input may include a button press selection of the first user interface element via an input device.

In some embodiments, the first graphical user interface element may consist of the first event indicator.

In some embodiments, the first event indicator and the second event indicator may be an icon that is a graphical representation of the event type.

In some embodiments, the program code may further cause the processor to identify, from a plurality of event types, the event type associated with the event and choosing from a list of options the icon based on the event type as identified.

In some embodiments, the geographical location may be a location of the occurrence of the event.

In some embodiments, the geographical location may be a location of the camera that captured the plurality of image frames of the video feed.

In some embodiments, the video feed may be a recorded video feed, and wherein the first graphical user interface element may be displayed in response to detecting that the time of the occurrence of the event is within a pre-determined timeframe of a current playback time of the recorded video feed.

In some embodiments, the video feed may be a live video feed, and wherein the first graphical user interface element may be displayed in response to detecting, in real-time and based on an event occurrence record being obtained from a data source, the occurrence of the event.

In some embodiments, the first graphical user interface element and the second graphical user interface element may be displayed at a same time on the graphical user interface corresponding to the time of the occurrence of the event.

In some embodiments, one of the first graphical user interface element and the second graphical user interface element may be displayed before the other of the first graphical user interface element and the second graphical user interface element, and wherein a period during which the first graphical user interface element is displayed may overlap with a period during which the second graphical user interface element is displayed, wherein the period during which the first graphical user interface element is displayed and the period during which the second graphical user interface element is displayed may correspond to the time of the occurrence of the event.

In some embodiments, the first graphical user interface element and the second graphical user interface element may be displayed at a predetermined time prior to the time of the occurrence of the event.

In some embodiments, the program code may further cause the processor to remove the first graphical user interface element and the second graphical user interface element following a lapse of a predetermined time from the time of the occurrence of the event.

In some embodiments, the removal of the first graphical user interface element and the second graphical user interface element occurs with a fading out effect, as the first graphical user interface element and the second graphical user interface element gradually increase in transparency until the first graphical user interface element and the second graphical user interface element are no longer visible on the graphical user interface.

In some embodiments, the first event indicator may be the same as the second event indicator.

In some embodiments, the program code may further cause the processor to receive an input within a third user interface element indicative of a camera and appearing on the digital map, and display the video feed and the video progress indicator associated with the video feed in response to receiving the input within the third user interface element.

Another broad aspect is non-transitory computer-readable medium having stored thereon program instructions for rendering a digital map within a graphical user interface displayed in association with a video feed, the program instructions executable by a processing unit for receiving a video feed comprising a plurality of image frames captured by a camera; rendering the video feed and a video progress indictor associated with the video feed on a graphical user interface; displaying, on at least one of the video feed and the video progress indicator, a first graphical user interface element indicative of an occurrence of an event, the first graphical user interface element displayed in correspondence with a time of the occurrence of the event, the first graphical user interface element comprising a first event indicator indicative of an event type associated with the event, the event associated with a geographical location; rendering, on the graphical user interface, the digital map; displaying in correspondence with the time of the occurrence of the event on the digital map a second graphical user interface element, the second graphical user interface element comprising a second event indicator associated with the event type, the second graphical user interface element displayed at a position on the digital map corresponding to the geographical location associated with the event.

In some embodiments, the program instructions may be executable by a processing unit for receiving an input within the first user interface element while the first user interface element is displayed on at least one of the video feed and the video progress indicator and displaying the digital map with the second graphical user interface element in response to receiving the input within the first user interface element.

In some embodiments, the input may be a first input, and the program instructions may be executable by a processing unit for: receiving a second input within the second graphical user interface element displayed on the digital map; and following the second input being received, displaying the video feed on the graphical user interface appearing on the display device to playback the video stream at the time of the occurrence of the event.

In some embodiments, the program instructions may be executable by a processing unit for receiving an input within the second user interface element while the second user interface element is displayed on the digital map and displaying the video feed and the video progress indicator associated with the video feed in response to receiving the input within the second user interface element.

In some embodiments, the input may be a first input, wherein the program instructions may be executable by a processing unit for: receiving a second input within the first graphical user interface element; and following the second input being received, displaying, on the graphical user interface, the digital map and the second graphical user interface element.

In some embodiments, the program instructions may be executable by a processing unit for rendering, on the graphical user interface, the third graphical user interface element indicative of the camera, the second graphical user interface element and the third graphical user interface element positioned on the digital map to indicate the positional relationship between the camera corresponding to the video feed and the occurrence of the event.

In some embodiments, the input may be a first input, and wherein the program instructions may be executable by a processing unit for receiving a second input of the third graphical user interface element appearing on the digital map; receiving the video feed of the camera associated with the third graphical user interface element; and displaying, on the graphical user interface generated on the display device of the computing device, a live video feed of the camera associated with the third graphical user interface element.

In some embodiments, the third graphical user interface element may be an icon of a camera.

In some embodiments, the video feed may be displayed in a first region of the graphical user interface; and the video progress indicator may appear in a second region of the graphical user interface, and wherein the digital map may be rendered in a first sub-region of the first region, wherein the first sub-region may be smaller than the first region.

In some embodiments, the video feed may be displayed in a first region of the graphical user interface; and the video progress indicator may appear in a second region of the graphical user interface, and wherein the digital map may be displayed in a third region of the graphical user interface separate from the first region and the second region.

In some embodiments, the video feed may be displayed in a first region of the graphical user interface; and the video progress indicator may appear in a second region of the graphical user interface, and wherein the digital map may occupy at least the first region and the second region, and the video feed and the video progress indicator may be occluded by the digital map.

In some embodiments, the first event indicator of the first graphical user interface element may appear on the video progress indicator at a position of the video progress indicator corresponding to the time of the occurrence of the event.

In some embodiments, the first graphical user interface element may be a pop-up element occupying at least in part a portion of the first region of the graphical user interface, the pop-up element displayed in correspondence with the time of the occurrence of the event.

In some embodiments, the input may include hovering over the first graphical user interface element with a cursor of an input device.

In some embodiments, the input may include a button press selection of the first user interface element via an input device.

In some embodiments, the first graphical user interface element may consist of the first event indicator.

In some embodiments, the first event indicator and the second event indicator may be an icon that is a graphical representation of the event type.

In some embodiments, the program instructions may be executable by a processing unit for identifying, from a plurality of event types, the event type associated with the event and choosing from a list of options the icon based on the event type as identified.

In some embodiments, the geographical location may be a location of the occurrence of the event.

In some embodiments, the geographical location may be a location of the camera that captured the plurality of image frames of the video feed.

In some embodiments, the video feed may be a recorded video feed, and wherein the first graphical user interface element may be displayed in response to detecting that the time of the occurrence of the event is within a pre-determined timeframe of a current playback time of the recorded video feed.

In some embodiments, the video feed may be a live video feed, and wherein the first graphical user interface element may be displayed in response to detecting, in real-time and based on an event occurrence record being obtained from a data source, the occurrence of the event.

In some embodiments, the first graphical user interface element and the second graphical user interface element may be displayed at a same time on the graphical user interface corresponding to the time of the occurrence of the event.

In some embodiments, one of the first graphical user interface element and the second graphical user interface element may be displayed before the other of the first graphical user interface element and the second graphical user interface element, and wherein a period during which the first graphical user interface element is displayed may overlap with a period during which the second graphical user interface element is displayed, wherein the period during which the first graphical user interface element is displayed and the period during which the second graphical user interface element is displayed may correspond to the time of the occurrence of the event.

In some embodiments, the first graphical user interface element and the second graphical user interface element may be displayed at a predetermined time prior to the time of the occurrence of the event.

In some embodiments, the program instructions may be executable by a processing unit for removing the first graphical user interface element and the second graphical user interface element following a lapse of a predetermined time from the time of the occurrence of the event.

In some embodiments, the first event indicator may be the same as the second event indicator.

In some embodiments, the program instructions may be executable by a processing unit for receiving an input within a third user interface element indicative of a camera and appearing on the digital map, and displaying the video feed and the video progress indicator associated with the video feed in response to receiving the input within the third user interface element.

BRIEF DESCRIPTION OF THE DRAWINGS

The invention will be better understood by way of the following detailed description of embodiments of the invention with reference to the appended drawings, in which.

DETAILED DESCRIPTION

The present disclosure relates to systems and methods for generating surveillance information appearing on a graphical user interface. More particularly, the systems and methods enable the display of location information of an event on a digital map and time information on a video feed related to the event of interest (e.g. a gunshot, a 911 call, a fire, etc.) by allocating space on a graphical user interface to the video feed and the digital map. Both the video feed (and its related video progress indicator) and the digital map include a graphical user interface element related to the same event, with a same or similar event indicator, acting as either a time marker for the video feed, or a location marker for the digital map, of the event of interest.

As such, a user can navigate between the digital map and the video feed, thereby accessing both geographical location information and time information on an event with little manipulation of the graphical user interface to receive this geographical location information and time information. The graphical user interface element conveys either the geographical location information and time information, while also possibly acting as a hotkey for shifting from the video feed to the digital map, or vice versa.

Figure 1:
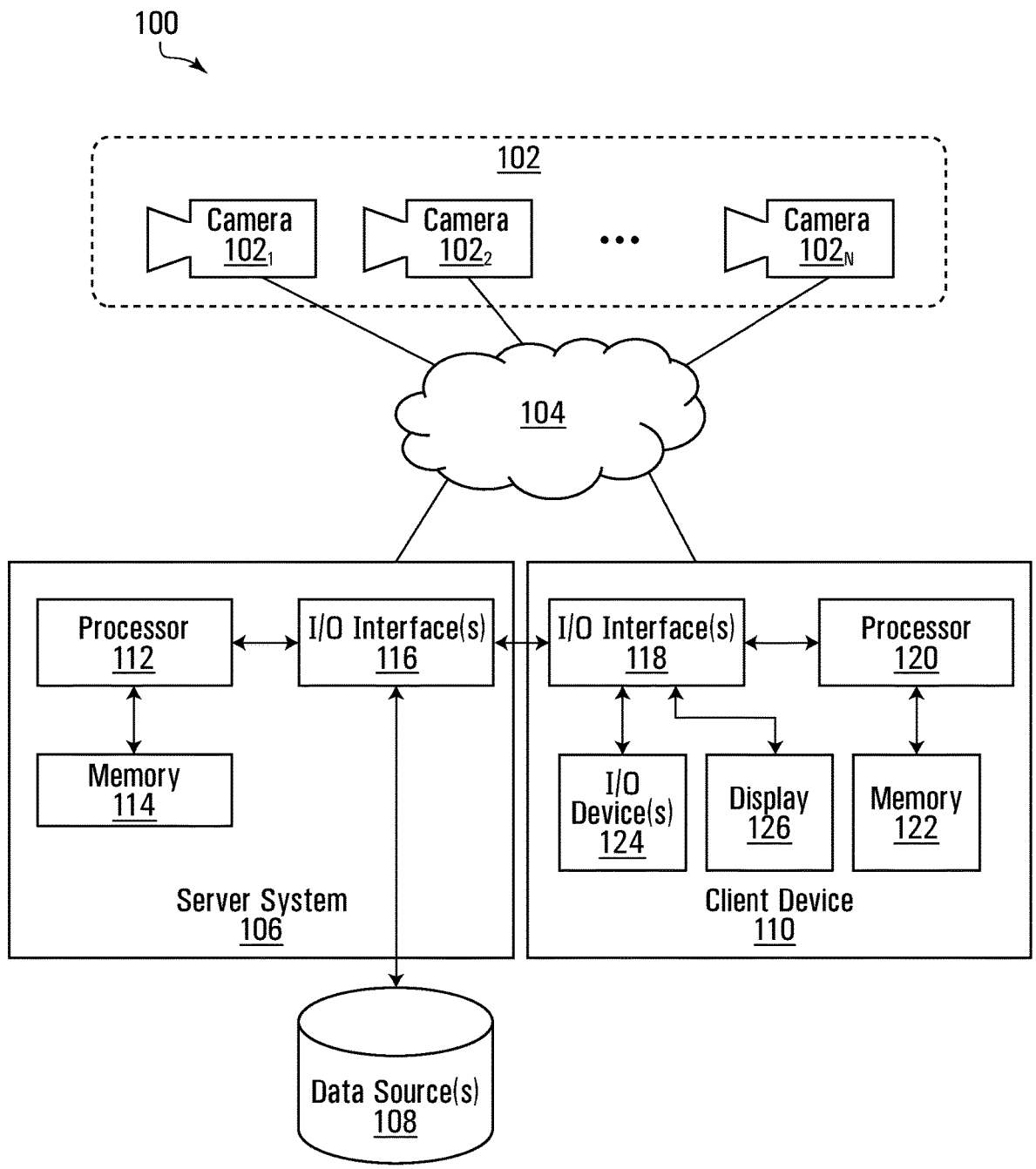
FIG. 1 is a schematic diagram illustrating a system for displaying information related to a video feed on a user interface.

FIG. 1 illustrates an example system 100 for displaying information related to a video feed on a graphical user interface. The system 100 may be an area monitoring system, such as the one described in U.S. Pat. No. 10,885,066, the contents of which are hereby incorporated by reference, or in PCT Patent Application No. PCT/CA2021/0511514, the contents of which are hereby incorporated by reference. The system 100 comprises a number (N) of video cameras 102, for instance cameras 1021, 1022, . . . , and 102N, disposed at various locations within a geographical area. It should be understood that any suitable number of cameras 102 may apply. The cameras 102 are used to monitor objects, events, places, and/or people of interest within the geographical area. When the system 100 comprises several cameras 102, the cameras 102 may be located in close proximity to one another, for instance in the same building or on the same city block, or they may be remote from one another, for instance, located in different parts of the same city or in different cities altogether. Embodiments involving clusters of video cameras 102 may also be considered, where video cameras 102 belonging to one of a number of clusters may be geographically proximate to one another while the clusters themselves may be remote from one another.

Event(s) of interest may be associated with video feed(s) captured by the cameras 102 and stored in one or more databases, such as in the data source(s) 108, as "occurrence records" (also referred to herein as "event occurrence records"). As used herein, the term "occurrence record" refers to information indicative of an event stored or provided by a data source and that may be accessed or obtained from the data source. The data source may be or may comprise a database that stores occurrence records. The occurrence record has an occurrence record type, and may have a time parameter and a geographical parameter. The occurrence record may have other metadata and data associated with additional parameters. The data structure of the occurrence record may depend upon the configuration of the data source and/or database in which the occurrence record is stored. Examples of occurrence records are surveillance video analytics, license plate reads associated with a time and geographical parameter, the identity of a registered criminal with a location of the criminal, 911 call events or computer-aided dispatch (CAD) events with a time parameter, geographical parameter, a narrative and/or a priority value, a gunshot event associated with the picking up of a sound that is identified to be a gunshot having a time parameter, a geographical parameter and perhaps the identification of the firearm, a traffic accident event with a time parameter and a location parameter, etc.

As used herein, the term "time parameter" refers to a parameter specifying time, such as a timestamp, a time interval, or a period of time. Each occurrence record may have one or more time parameters associated therewith.

As used herein, the term "geographical parameter" refers to a location, such as Global Positioning System (GPS) coordinates (e.g., coordinates associated with a location at which the event occurred). The geographical parameter may also be a location range or an area defined by a set of coordinates. The geographical parameter may also be a straight-line distance between a location of a given camera having captured an event and the location at which the event occurred. The geographical parameter may further be a radial distance from the given camera's location to the location at which the event occurred. The distances may be specified in any suitable unit of distance such as meters, kilometers, miles, etc. In addition, the geographical parameter may comprise a direction (e.g., cardinal direction) to the location at which the event occurred. Each occurrence record may have one or more geographical parameters associated therewith.

As used herein, the term "occurrence record type" refers to the nature or type of the occurrence record. For example, the occurrence record type may be one of a surveillance video analytics event, a 911 call or CAD call, the identity of a known criminal, a gunshot event, a license plate read event, etc. Data sources and/or databases storing occurrence records may be associated with an occurrence record type.

As used herein, the term "event type" refers to the nature or type of the event associated with the video feed captured by the camera(s) 102. For example, the event type may comprise, but is not limited to, a gunshot event, a stolen car event, a gas leak event, a glass break event, a door opening event, and the like. The event type may be associated with the occurrence record type such that data sources and/or databases storing occurrence records may also store an event type.

As used herein, the term "query" refers to a request for information from a data source as in 108 and/or database. The query may include, but is not limited to, an occurrence record type or types, an event type or types, one or more time parameters, and one or more geographical parameters. The query may specify additional parameters as a function of the occurrence record type. For instance, when the occurrence record type is a database of convicts, the additional parameters may be convicts that have been charged with third degree murder, or convicted with third degree murder, or that are under the age of 25, that have blond hair, blue eyes, etc. The time parameter may be a defined time, or time range (e.g. in the two years preceding the date of the query). The geographical parameter may be a specific location (e.g. a set of coordinates), or an area (e.g. defined by a plurality of sets of coordinates).

Still referring to FIG. 1, the cameras 102 are communicatively coupled, over a network 104, to a server system 106 which is in turn in communication with one or more data sources 108. The network 104 may comprise any suitable network including, but not limited to, a Personal Area Network (PAN), Local Area Network (LAN), Wireless Local Area Network (WLAN), Metropolitan Area Network (MAN), or Wide Area Network (WAN), or combinations thereof. The server system 106 may store or archive video data from the cameras 102 (e.g., in the memory 114, in one or more of the data sources 108, etc.).

The server system 106 may be a server-based system (as shown in FIG. 1) in communication with one or multiple client devices 110 that may, in some embodiments, also be configured to access the network 104. The server system 106 is illustratively configured to obtain data related to event(s) of interest associated with the video feed(s) captured by the camera(s) 102 and may store the data (e.g., in the data source(s) 108) as one or more occurrence records. As will be discussed further below, the server system 106 is also configured to transmit the data (e.g., video feeds) obtained from the cameras 102, along with any additional relevant information that may be retrieved from the data source(s) 108, to the one or more client devices 110 for presentation on a graphical user interface (GUI). In some cases, the video data (e.g., video feeds) are transmitted directly from the cameras 102 through the network 104 to the one or more client devices 110 for presentation on a GUI. The server system 106 may be internal or "on-site", located in close proximity to the client device 110, for instance in the same building, or may be external or "off-site", located remotely from the client device 110, for instance in a remote data center. The server system 106 may be a cloud-based system.

The server system 106 has at least one processor 112, memory 114, and at least one input/output (I/O) interface 116 for communication with the one or more data sources 108, and/or an I/O interface 118 of the client device 110. The one or more data sources 108 may be one or more external database(s), one or more external systems, for example, having one or more databases, that are accessible via Application Programming Interface (API) calls, and/or one or more local databases that are part of the server system 106.

The processor 112 may be a general-purpose programmable processor. In the example of FIG. 1, the processor 112 is shown as being unitary, but the processor 112 may also be multicore, or distributed (e.g. a multi-processor).

The computer readable memory 114 stores program instructions and data used by the processor 112. The computer readable memory 114 may also store locally occurrence records, acting as a local database. The memory 114 may also store information regarding the data source(s) 108 that are accessible by the server system 106, such as the identity of the data sources 108, the configuration type of the data sources 108, the occurrence record type of the data sources 108, etc. (i.e. the database attribute data structures). The computer readable memory 114, though shown as unitary for simplicity in the example of FIG. 1, may comprise multiple memory modules and/or caching. In particular, the memory 114 may comprise several layers of memory such as a hard drive, external drive (e.g. SD card storage) or the like and a faster and smaller Random Access Memory (RAM) module. The RAM module may store data and/or program code currently being, recently being or soon to be processed by the processor 112 as well as cache data and/or program code from a hard drive. A hard drive may store program code and be accessed to retrieve such code for execution by the processor 112 and may be accessed by the processor 112 to store and access data. The memory 114 may have a recycling architecture for storing, for instance, occurrence records, data source and/or database coordinates, where older data files are deleted when the memory 114 is full or near being full, or after the older data files have been stored in memory 114 for a certain time.

The I/O interface(s) 116 is in communication with the processor 112. The I/O interface(s) 116 may comprise a network interface and may be a wired or wireless interface for establishing a remote connection with, for example, a remote server, an external data source 108, the client device 110, etc. For instance, the I/O interface(s) 116 may be an Ethernet port, a WAN port, a TCP port, etc.

The processor 112, the memory 114 and the I/O interface(s) 116 may be linked via bus connections.

The data source(s) 108 may be one or more remote server(s) comprising one or more databases. A data source 108, and in particular a database, may contain occurrence records, information, corresponding to at least one occurrence record type.

In some examples, the server system 106 may have a local database stored, e.g., in memory 114, that contains occurrence records of at least one occurrence record type.

The client computing device 110 may be a remote computing device (i.e. client). One or more client computing devices 110 may be provided, in close proximity to one another, for instance located in the same office or data center, or remote from one another, for instance located in different offices and data centers dispersed across the same city or in different cities altogether.

The client computing device 110 is in communication with the I/O interface(s) 116 of the server system 106. The computing device 110 has a processor 120, a memory 122, I/O interface(s) 118 that may be linked via bus connections. The computing device 110 may have (or be connect to) any suitable I/O device(s) 124, for example, such as a keyboard, a mouse, a touchscreen, etc. The computing device 110 may be a desktop computer, a laptop, a smartphone, a tablet, etc. The computing device 110 has (or is connect to) a display 126 (e.g. a screen, a tactile display, etc.). The processor 120, the memory 122 and the I/O interface(s) 118 may be similar to the processor 112, the memory 114 and the I/O interface(s) 116, respectively.

A client application program may be stored in memory of the computing device 110 that is associated with the server system 106, the client application program providing the user with an interface to interact with the server system 106.

In some embodiments, the server system 106 may include at least one computing device 110, where, for instance, the connection between the server system 106 and the computing device 110 may be a wired connection. In some embodiments, the functionality of the server system 106 and the client computing device 110 may be implemented on a single computing device.

The client computing device 110 may be operated by user(s) to access, view, process, edit and/or analyze information associated with a video feed captured by the cameras 102, the information received via the server system 106. The information may comprise video information, such as the video feed, as well as relevant information obtained from the data source(s) 108. The client computing device 110 may be configured to launch a video playback application (not shown) that renders a GUI on the display 126. The client computing device 110 may be configured to launch a web browser or web application (not shown) that renders a GUI on the display 126. The GUI may be used to display outputs and accept inputs and/or commands from user(s) of the client computing device 110. As will be described further below, the GUI further provides user(s) with the ability to view and/or edit video feeds, as well as be presented information of interest related to the video feeds.

The system 100 may comprise a wide variety of different network technologies and protocols. Communication between the cameras 102, server system 106, data source(s) 108, and client computing device 110 may occur across wired, wireless, or a combination of wired and wireless networks. The system 100 may include any number of networking devices such as routers, modems, gateways, bridges, hubs, switches, and/or repeaters, among other possibilities, communicatively coupled to the cameras 102, server system 106, data source(1) 108, client computing device 110 and/or at any point along network 104.

For purposes of illustration, reference is made herein to a system 100 used for security purposes, such as the identification of a crime associated with a known felon, the identification of a stolen vehicle, or the like. However, it should be understood that the system 100 may be used for any other suitable purpose, such as for assisting tourists with the identification of events of interest occurring around the city, or for monitoring public transport or traffic, etc.

A client application program may be stored in memory of the computing device 110 that is associated with the system 106, the client application program providing the user with an interface to interact with the system 106. The client application program may generate the graphical user interface, with a video feed and/or a digital map, on the display 126 of the client computing device 110.

In some embodiments, the system 106 may include at least one computing device 110, where, for instance, the connection between the system 106 and the computing device 110 may be a wired connection or a wireless connection. In some embodiments, the functionality of the system 106 and the client computing device 110 may be implemented on a single computing device.

It will be understood that in some embodiments, there may be no client-server relationship between the computing device 110 and the server system 106.

Figure 2A:
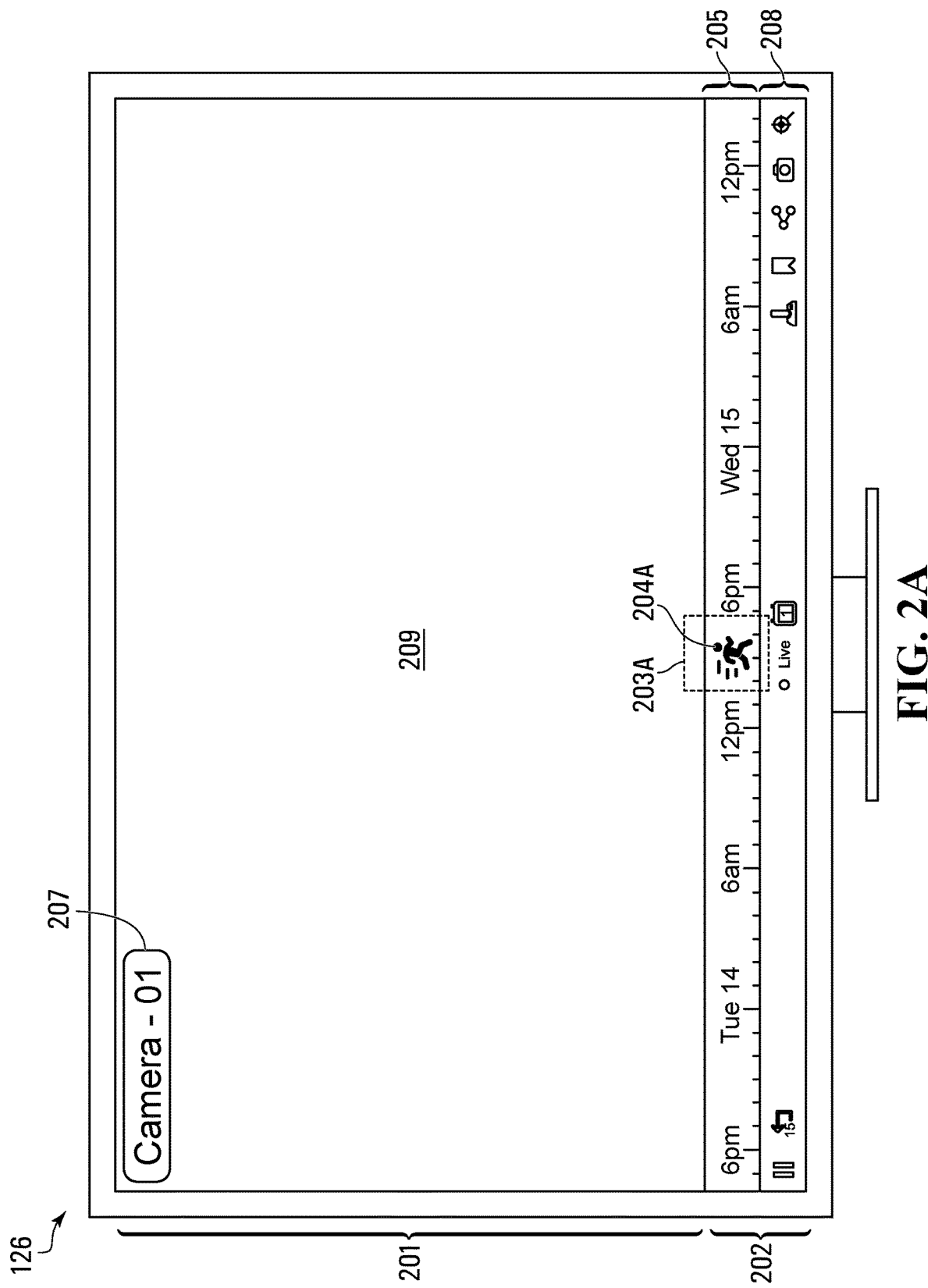
FIG. 2A is a drawing of an exemplary graphical user interface displaying a video feed and video progress indicator, with an exemplary graphical user interface element.

Exemplary Graphical User Interface:

Reference is now made to FIG. 2A, illustrating an exemplary graphical user interface generated on a display 126 of a computing device, by the computing device (e.g. client computing device 110, receiving instructions from the server system 106).

The graphical user interface includes a first region 201 and a second region 202. The first region 201 includes the video feed 209. The second region 202 includes a video progress indicator 205 and may include one or more navigation controls 208. The graphical user interface may also include a tag or identifier of the camera that is the sources of the video feed displayed on the graphical user interface.

The video feed 209 may be a video feed that is streamed live or a recorded video feed (e.g. footage generated by a surveillance camera, such as one of cameras 102.

The video progress indicator 205 provides information on the progress time of the video feed. The video progress indicator 205 may indicate the lapsed time since the start of the video feed (e.g. the start of the pre-recorded video, or a start time of when the camera that is the source of a live video feed started generating the video feed). The video progress indicator 205 may also display information on the ratio between a portion of the video feed that has been watched and a portion of the video feed that remains unwatched. The video progress indicator 205 may be a stop-watch or clock showing the lapsed progress time of the video, a video timeline illustrating as a bar a progress of the video (as shown in FIG. 2A), etc.

The video progress indicator 205 may also include navigation controls 208 enabling control of progress of the video feed. Exemplary navigation controls 208 include, but are not limited to, a "play" icon, a "pause" or "stop" icon, a "speed-up" button or a "slow down" button, etc. (which can be a video timeline, a numeric clock showing a progress time of the video, etc.)

A graphical user interface element 203A or 203B appears at given times and positions on the graphical user interface. The graphical user interface element is a marker that is adapted to convey to a user information on the event, such as a location related to the event and/or a time of the event. As such, the graphical user interface element is related to an event. The graphical user interface element appears on the graphical user interface at a time or period of time corresponding to the time of the corresponding event. In some embodiments, the graphical user interface element 203A appears on the video progress indicator 205 or the video feed

209. In some embodiments, the graphical user interface element 203A appears on, above or below the video progress indicator 205, acting as a marker on the video progress indicator of a time corresponding to the time of the event. The graphical user interface element 203A may be visible for a given time before and after the time of the event. A graphical user interface element 203B also appears on a digital map, the graphical user interface element marking on the digital map a position corresponding to the geographical location of the event corresponding to the graphical user interface element.

The graphical user interface element 203A or 203B includes an event indicator 204A or 204B, respectively. The event indicator 204A or 204B indicates to the user information on the nature of event (e.g., event type) that has occurred at a time corresponding to the appearance of the graphical user interface element on the graphical user interface. The event indicator may be a letter, text or other indicia that corresponds to a type of event, where each event type has a different letter, text or other indicia. The event indicator may be an icon or symbol whose appearance is related to the event type. For instance, when the event type is that of a "gunshot" detection, the icon of the event indicator may be a gun or a bullet. When the event type is that of medical emergency, such as a heart attack, the icon of the event indicator may be a cross or a heart. When the event type is that an alarm that has gone off, the icon of the event indicator may be that of a bell, etc.

Figure 2B:
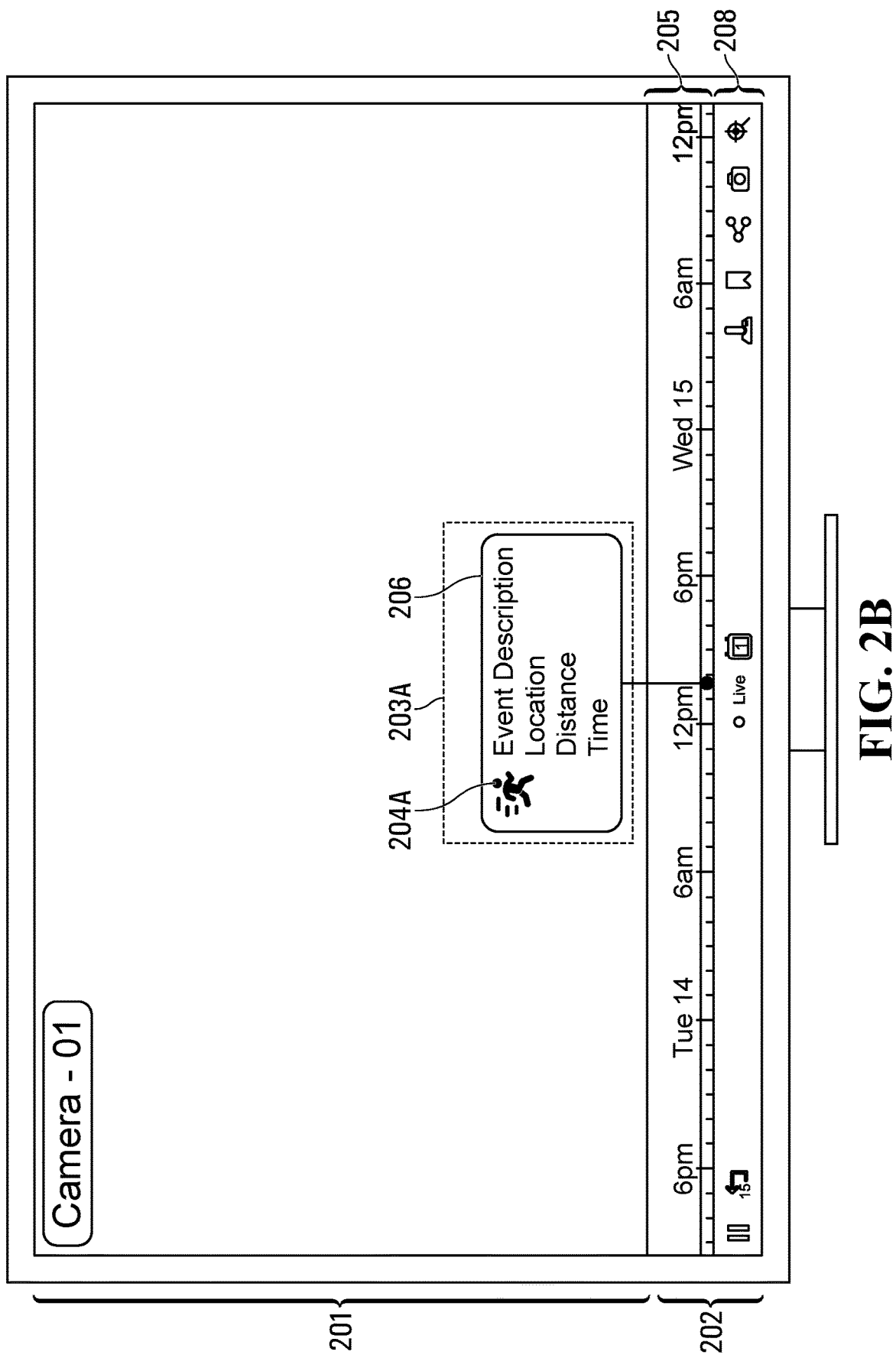
FIG. 2B is a drawing of an exemplary graphical user interface displaying a video feed and video progress indicator, with an exemplary graphical user interface element including a pop-up element.

In some embodiments, as illustrated in FIG. 2B, the graphical user interface element 203A may include a pop-up element 206. The pop-up element 206 is a window displaying information on the event corresponding to the graphical user interface element 203A. The information displayed in the pop-up element 206 may be the event indicator 204A. The information displayed in the pop-up element 206 may include one or more of the location of the event, the time of the event, an event description, a distance between the geographical position of the event and the camera that is the source of the video feed appearing on the graphical user interface, etc. In some implementations, the pop-up element 206 appears above or below the video progress indicator 205. A line or segment may connect the pop-up element 206 to the video progress indicator 205, where the line or segment may mark a time on the video progress indicator 205 corresponding to the time of the event corresponding to the graphical user interface element 203A, where the pop-up element 206 changes position as a function of progress of the video progress indicator 205. In some instances, the pop-up element 206 with the event indicator 204A may appear directly on the video progress indicator 205.

In some examples, the graphical user interface element 203A consists solely of the event indicator 204A, as shown in FIG. 2A (where, in FIG. 2A, the event indicator 204A appears directly on the video progress indicator 205).

Figure 3:
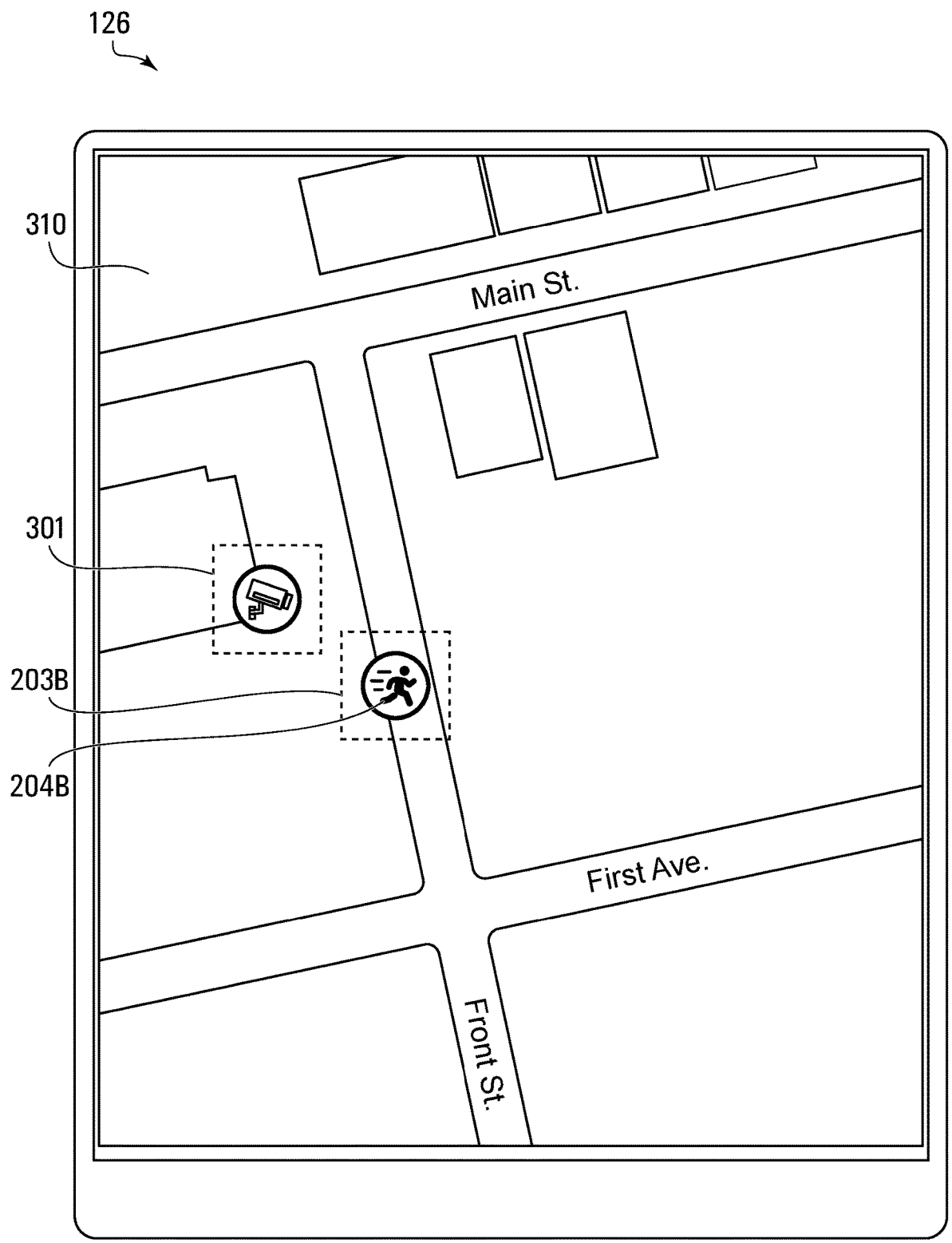
FIG. 3 is a drawing of an exemplary graphical user interface displaying a digital map with an exemplary graphical user interface element.

The present system enables display of a digital map and a video feed (with or without a transition between the digital map and the video feed, or vice-versa), appearing on a graphical user interface, each displaying information related to an event, as explained herein. Reference is now made to FIG. 3, illustrating an exemplary digital map displayed on a graphical user interface appearing on a display of a computing device (such as computing device 110).

Figure 9:
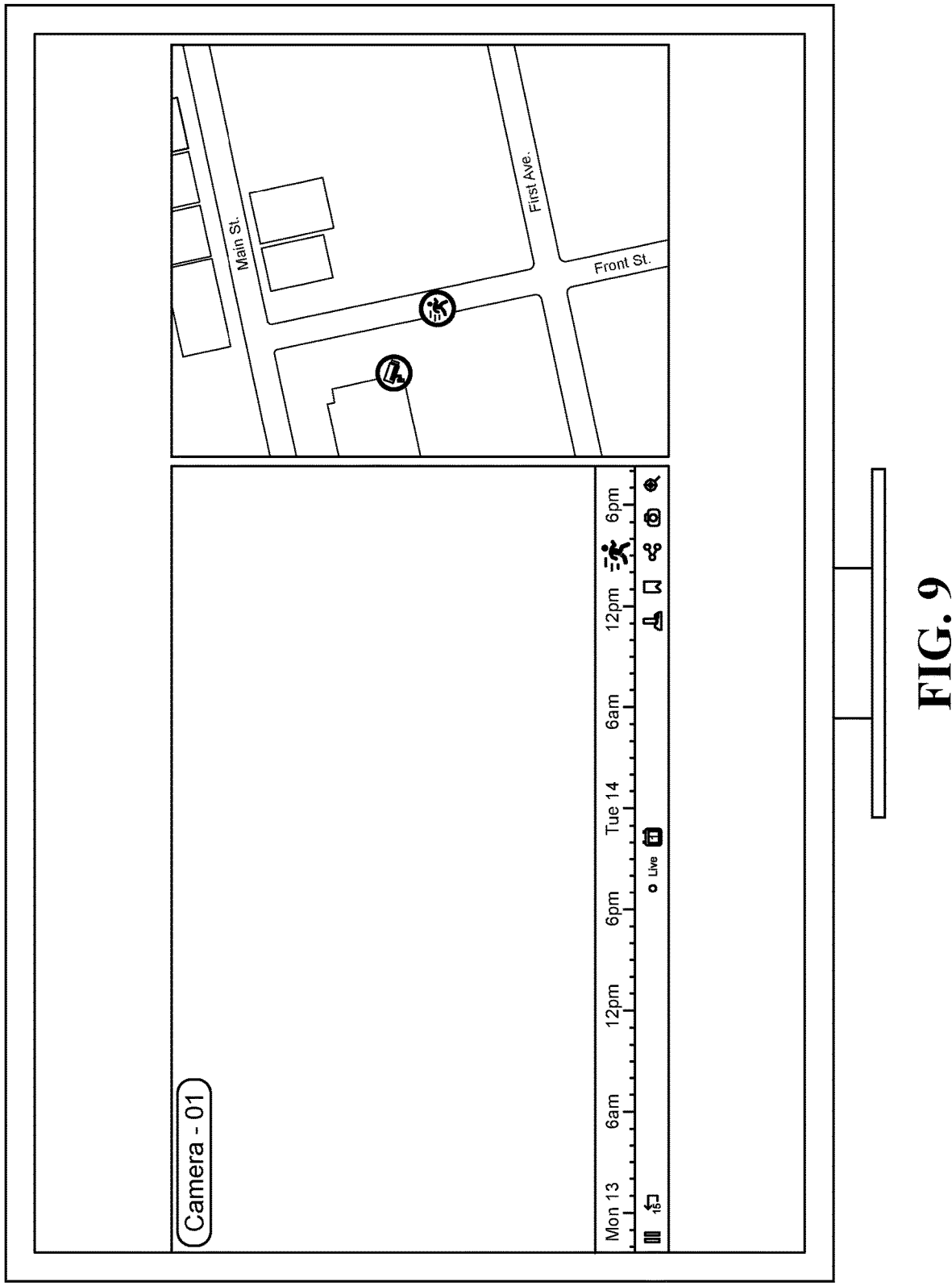
FIG. 9 is a drawing of an exemplary graphical user interface displaying a video feed next to a digital map, exemplary graphical user interface elements present with respect to the video feed and on the digital map.

In some instances, both the digital map and the video feed may be displayed simultaneously on the graphical user interface, as illustrated in FIG. 9.

It will be understood that the digital map 310 of FIG. 3 shows an exemplary layout of streets and constructions for purposes of illustration, and that the digital map in accordance with the present teachings varies depending on the layout and geography of the area being depicted on the digital map.

The digital map 310 includes thereon the graphical user interface element 203B appearing at a location on the digital map corresponding to the geographical location of the event (e.g. defined by global positioning system (GPS) coordinates). The graphical user interface element 203B includes the event indicator 204B. The graphical user interface element 203B may include a frame (e.g. with a bubble, circle, or drop shape) surrounding the event indicator 204B.

When transitioning between the video feed and digital map, the event indicator 204A appearing on the video feed 209 or the video progress indicator 205 corresponds to the event indicator 204B appearing on the digital map 310, as both the event indicator 204A and 204B relate to the same event. Accordingly, in some instances, for facilitating a user's viewing of the video feed and the digital map to identify corresponding events, the event indicator 204A appearing on the video feed 209 or the video progress indicator 205 may be the same as or is substantially similar to the event indicator 204B appearing on the digital map 310. However, one would appreciate that the appearance between the first event indicator 204A and the second event indicator 204B may vary without departing from the present teachings, provided the first event indicator 204A and the second event indicator 204B relate to the same event. It will be understood that other components of the graphical user interface element appearing on the video feed or video progress indicator and the graphical user interface element appearing on the digital may vary (such as the frame of the graphical user interface element) without departing from the present teachings.

In some embodiments, one or more additional graphical user interface elements 301, corresponding respectively to one or more cameras or other detector devices, may also appear on the digital map 310. The location of each of the one or more graphical user interface elements on the digital map 310 corresponds to the real-life geographical location of the corresponding camera or detector device of the one or more cameras or detector devices.

In some instances, the one or more additional graphical user interface elements 301 include an icon representing a camera or another type of detector device. In some instances, the one or more graphical user interface elements 301 include a symbol or letter representing the nature of the detector device, camera, etc.

It will be understood that in some instances, the video feed, the video progress indicator and/or the digital map may be populated by more than one graphical user interface element and event indicator, depending on the number of events that are associated with the video feed and/or the geographical area rendered on the digital map.

Figure 8:
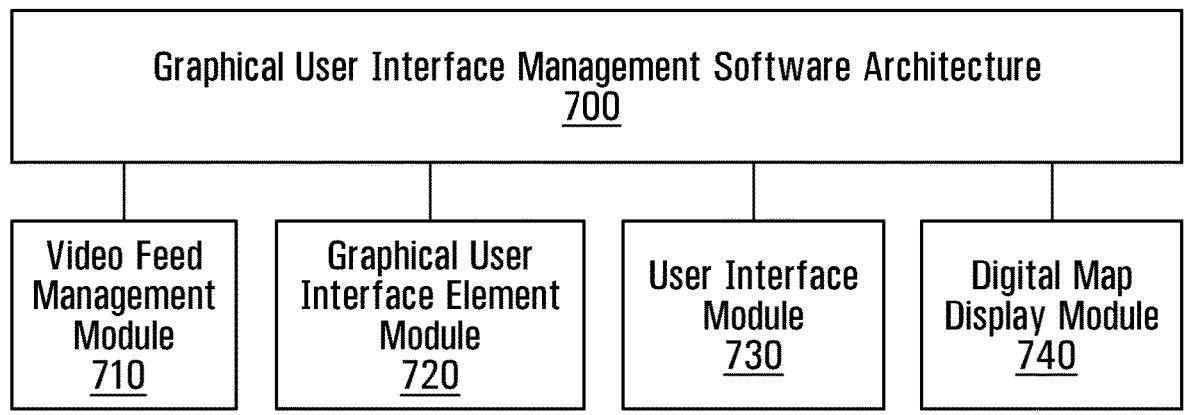
FIG. 8 is a block diagram of exemplary graphical user interface management architecture.

Exemplary Graphical User Interface Management Software Architecture:

Reference is now made to FIG. 8, illustrating an exemplary software architecture 700 of the server system 106 and of the computing device 110 for managing a graphical user interface displaying video feeds and/or a digital map.

The system 106 has program code, stored in memory 114, that includes a video feed management module 710. The computing device 110 has program code, stored in memory 122, that includes a graphical user interface element module 720, a digital map display module 740 and a user interface module 730. Each of the video feed management module 710, the graphical user interface element module 720, the digital map display module 740 and the user interface module 730 includes program code configured to implement the functionality of the modules as is described herein. In some embodiments, video feed management module 710, the graphical user interface element module 720, the digital map display module 740 and the user interface module 730 may be on a single computing device, such as the computing device 110.

The user interface module 730 provides a graphical user interface (GUI) in the client computing device 110. The GUI is adapted to display one or more video feeds following instructions received from the video feed management module 710. The GUI is also adapted to display a video progress indicator associated with the displayed video feed. The video progress indictor may include navigation controls such as a "play" icon, a "pause" or "stop" icon, a "speed-up" button, a video progress indicator (which can be a video timeline, a numeric clock showing a progress time of the video, etc.) The GUI is adapted to display a digital map following receipt of instructions from the digital map display module 740.

The video feed management module 710 includes program code that, when executed by the processor 112, causes the processor 112 to optionally receive one or more video feeds from one or more cameras 102, respectively, or optionally retrieve a video feed from memory 114 or from the one or more data sources 118. The video feed management module 710 may also include program code that, when executed by the processor 112, causes the processor 112 to transmit the one or more video feeds to the computing device 110 and to generate instructions for causing the user interface module 730 to display the one or more video feeds, and one or more video progress indicators corresponding to the one or more displayed video feeds.

The graphical user interface element module 720 includes program code that, when executed by the processor 120, causes the processor 120 to generate instructions for causing the appearance of a first graphical user interface element on either a video feed or a video progress indicator, or a digital map, displayed on the graphical user interface appearing on display 126. The graphical user interface element module 720 includes program code that, when executed by the processor 120, causes the processor 120 to receive user input within the first graphical user interface element. In some instances, instead of receiving user input within the first graphical user interface element, the graphical user interface element module 720 includes program code that, when executed by the processor 120, causes the processor 120 to determine if a condition is fulfilled associated with the event or the appearance of the first graphical user interface element (e.g. that a time constraint is met following the displaying of the first graphical user interface element on the graphical user interface). Upon receipt of the user input, or verification that the condition is fulfilled, depending on if the video feed or the video progress indicator, or the digital map, is displayed on the graphical user interface appearing on display 126, the graphical user interface element module 720 causes the display of the other of the video feed or the video progress indicator, or the digital map by calling either the video feed management module 710 (for displaying the video feed and the video progress indicator) or the digital map display module 740 (for displaying the digital map) on the graphical user interface appearing on the display 740.

The graphical user interface element module 720 includes program code that, when executed by the processor 120, causes the processor 120 to generating instructions for causing the display of the second graphical user interface element on either the video feed or the video progress indicator, or the digital map, that has been displayed following the receipt of selection of user input within the first graphical user interface element, or following the fulfillment of a condition for causing the display of the video feed or the video progress indicator, or the digital map.

In some instances, the graphical user interface element module 720 includes program code that, when executed by the processor 120, causes the processor 120 to generate instructions for displaying additional graphical user interface elements on the digital map appearing on the graphical user interface appearing on the display 126, corresponding to one or more cameras and or one or more detector devices. A position of each additional graphical user interface element is selected as a function of a geographical location of the corresponding camera or detector device.

In some instances, the graphical user interface element module 720 includes program code that, when executed by the processor 120, causes the processor 120 to generate commands for causing the display on the digital map of one or more additional graphical user interface elements corresponding to one or more cameras or detector devices.

In some embodiments, the graphical user interface element module 720 includes program code that, when executed by the processor 120, causes the processor 120 to analyze the occurrence record corresponding to the event to determine an event type. The graphical user interface element module 720 further includes program code that, when executed by the processor 120, causes the processor 120 to select an icon from a list of icons for the event indicator that corresponds to the determined event type for the event.

The first graphical user interface element and the second graphical user interface element displayed following the generating of instructions from the graphical user interface element module 720 share an event indicator.

The digital map display module 740 includes program code that, when executed by the processor 120, causes the processor 120 to instruct the display of a digital map on the graphical user interface appearing on display 126. The digital map is displayed as a function of the geographical location of the event that corresponds to the graphical user interface element that appears on the digital map. The digital map may be sourced from a remote database of digital maps or from an online, third-party service for providing digital maps. This results in the digital map displaying the geographical location of the event, corresponding to the location of the graphical user interface element on the digital map. In some instances, the digital map may be centered with respect to the location of the graphical user interface element appearing on the digital map. In some embodiments, the user may input zoom or resolution settings for the displayed digital map, affecting the scale of the information appearing on the digital map.

In some instances, the graphical user interface elements, video progress indicator, digital map, and/or other components displayed on the graphical user interface, may be generated, i.e. where the appearance and/or function of each of the graphical user interface elements, video progress indicator, digital map, and/or other components displayed on the graphical user interface is created and defined, prior to the display of the graphical user interface elements, video progress indicator, digital map, and/or other components of the graphical user interface on the graphical user interface. In some instances, the graphical user interface elements, video progress indicator, digital map, and/or other components displayed on the graphical user interface are pre-generated with the graphical user interface, and the pre-generated navigation controls are then displayed when required, as described herein. In some instances, the graphical user interface elements, video progress indicator, digital map, and/or other components are generated once and then populate dynamically the graphical user interface, as required, for display of the graphical user interface elements, video progress indicator, digital map, and/or other components.

Figure 4:
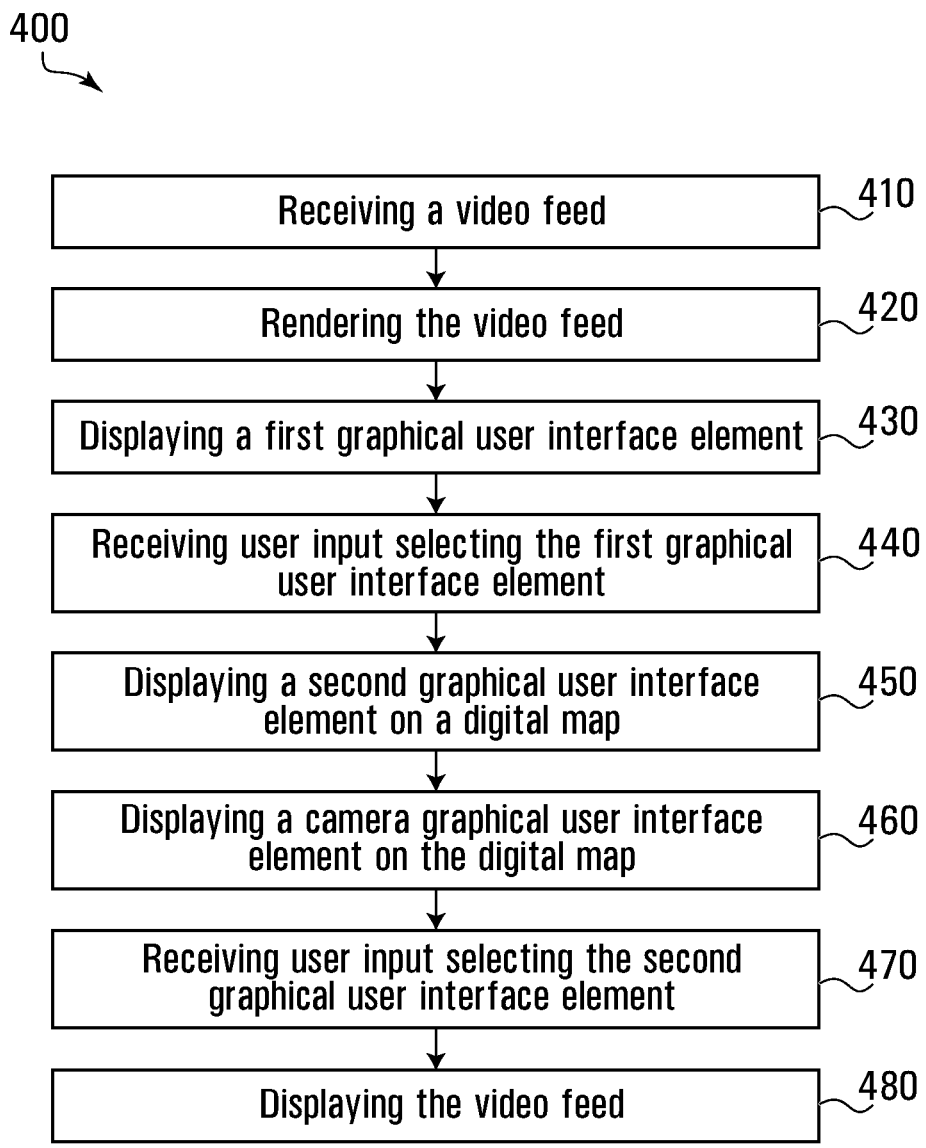
FIG. 4 is a flowchart diagram of an exemplary method of rendering a digital map from an input within a graphical user interface element displayed in association with a video feed on a graphical user interface.

Exemplary Method of Rendering a Digital Map from Input within a Graphical User Interface Element Displayed in Association with a Video Feed:

Reference is now made to FIG. 4, illustrating an exemplary method 400 of rendering a digital map from an input within a graphical user interface element displayed in association with a video feed on a graphical user interface. The method may be performed by the computing device 110.

A video feed generated by a camera is received at step 410. For example, the video feed may be received at the server system, which then provides it to the computing device. The video feed may be a pre-recorded video feed, stored in memory (such as an external data source). In other embodiments, the video feed may be played live, the video feed received from the camera at a server that is then transmitted to the computing device that is displaying the video feed in real-time or near real time. In some embodiments, the video feed may be received from the camera at the computing device that is displaying the video feed, which may be live or pre-recorded video.

The video feed is then rendered on a graphical user interface generated on a display of a computing device at step 420. A video progress indicator is also displayed on the graphical user interface, corresponding to the rendered video feed, for displaying the progress of the video feed. The video feed is displayed in a first region of the graphical user interface and the video progress indicator in a second region of the graphical user interface.

A first graphical user interface element is displayed on the video feed or on the video progress indicator at step 430 (e.g. graphical user interface element 203A illustrated at FIG. 2A). The first graphical user interface element corresponds to an event that has occurred at a given time and that corresponds to a geographical location. The geographical location may be the location at which the event took place (e.g. the GPS coordinates of the location where an emergency call was placed; the GPS coordinates of a stolen vehicle when the vehicle has GPS positioning, etc.). The geographical location of the event may be a location of the detector device (such as a microphone for a gunshot) or of the camera that has picked up on the event.

The first graphical user interface element appears on the video feed or the video progress indicator, at a time corresponding to the time of the event. The time corresponding to the time of the event may be, e.g., the real-time occurrent of the event, the playback time of the event on the video feed and/or the digital map. For instance, when the video progress indicator includes a video timeline, the first graphical user interface element may mark a time on the video timeline (e.g. be positioned on the video timeline at an appropriate time) corresponding to the time of the event. In some embodiments, the first graphical user interface element may appear on the video feed or the video progress indicator for a given period of time before and after the time of the event. In one embodiment, as the time markings on the video timeline shift gradually to illustrate the passage of time of the video feed, the first graphical user interface element appearing on the video timeline may shift with the time markings, with the progression of the video progress indicator. For instance, if the time markings first appear at the right of the graphical user interface and then translate over to the left of the graphical user interface before disappearing, making room for new time markings to illustrate the passage of time, the first graphical user interface element appearing on the video timeline or associated with a time marking may follow the same movement, shifting from right to left of the graphical user interface.

In some instances, the occurrence records or event information may be received (e.g. at the system 106) in real-time or in near real-time, which causes the first graphical user interface element to appear with respect to the video feed.

When the video feed has been pre-recorded, the video feed data for generating the video feed may include metadata for identifying a time in a progress of the video feed when an event took place. The metadata may include information on the event, such as an event type of the event, a geographical location of the event type, etc. In some embodiments, the metadata can be used to determine a presence of an event, with respect to a video feed, prior to its playback time in the video feed to allow a graphical user interface element related to the event to be displayed for a time prior to the occurrence of the event. A time difference between the current playback time and the event time may be calculated (e.g. a set variable), and when the time difference is below a threshold, then the graphical user interface element relating to the event may be displayed with respect to the video feed.

In some instances, initial input may be received or a rule may be set to filter through events or occurrence records to identify occurrence records or events that match the input or rule. Graphical user interface elements corresponding to the occurrence records or events that match the input or rule may then be displayed on the graphical user interface.

In some instances, the display of a graphical user interface element on the graphical user interface may follow a query for a specific event or occurrence record corresponding to the displayed graphical user interface element. In some instances, the event or occurrence records associated with the video feed (e.g. the camera that is the source of the video feed) may be automatically displayed on the graphical user interface at an appropriate time.

In some instances, the event indicator of the first graphical user interface element may be an icon. A determination of an event type of the event corresponding to the first graphical user interface element may be made. The selection of an appropriate icon can be based on the determination of the event type of the event, where the icon symbolizes the event type, providing the user with a visual queue as to the nature of the event corresponding with the first graphical user interface element. For instance, if the event type is that of a fire, the icon may be that of a flame. For instance, if the event type is that of a robbery, the icon may be that of a person running.

In some embodiments, user input may be received within the first graphical user interface element at step 440, using one or more user input devices, for displaying a digital map, as described at step 450. The user input may be provided using one or more I/O devices, such as a mouse, a touchscreen, a keyboard, a microphone, a motion sensor, etc. The user input may include, but is not limited to, a button-press of a mouse, a button-press of a keyboard, a press on a touchscreen, a voice command captured by a microphone, a motion captured by a motion sensor leading to a selection of a video stream tile, eye motion captured by a vision tracker directed towards the selected video stream tile, or a combination thereof. In some instances, the user input may be moving a cursor over, or hovering over, the first graphical user interface element. In some instances, the user input may be a selection of the event indicator of the first graphical user interface element.

In other embodiments, no user input may be received, where the displaying of a digital map is instead triggered by the appearance of the first graphical user interface element on the graphical user interface (e.g. at a time corresponding to the time of the event) and/or by the occurrence of the corresponding event (e.g., by receiving an occurrence record). The digital map may remain visible as long as the first graphical user interface element appears on the video feed or video progress indicator.

A second graphical user interface element is then displayed on a digital map (that may also be displayed on with respect to the video feed) with the event indicator of the first graphical user interface element at step 450 (graphical user interface element 203B illustrated on FIG. 3). The terms "first" and "second" before the "first graphical user interface element" and "second graphical user interface element" as used herein are labels to distinguish between two different graphical user interface elements. The order in which the graphical user interface elements is not necessarily implied by the use of "first" and "second". While in some embodiments, the first graphical user interface element may appear before the second graphical user interface element, in other embodiments, the converse occurs. In some embodiments, the first graphical user interface element and second graphical user interface element appear at the same time or at substantially the same time.

The second graphical user interface element appears at a location on the digital map corresponding to the geographical location of the event, thereby providing a visual queue to the user as to the location of the event.

The display of the digital map may result in the digital map obscuring the space of the graphical user interface previously occupied by the video feed and/or the video progress indicator (e.g. where the digital map is located in a window of the graphical user interface laid over the video feed and/or the video progress indicator). In some embodiments, the digital map may occupy the entire graphical user interface, as illustrated in FIG. 3.

In some examples, the digital map may occupy a third region of the graphical user interface, independent from the first region and the second region (as shown in FIG. 9, where the digital map appears next to the video feed and video progress indicator). In some examples, the digital map may occupy part of the first region and/or part of the second region (a sub-region of the first region or of the second region).

Figure 15A:
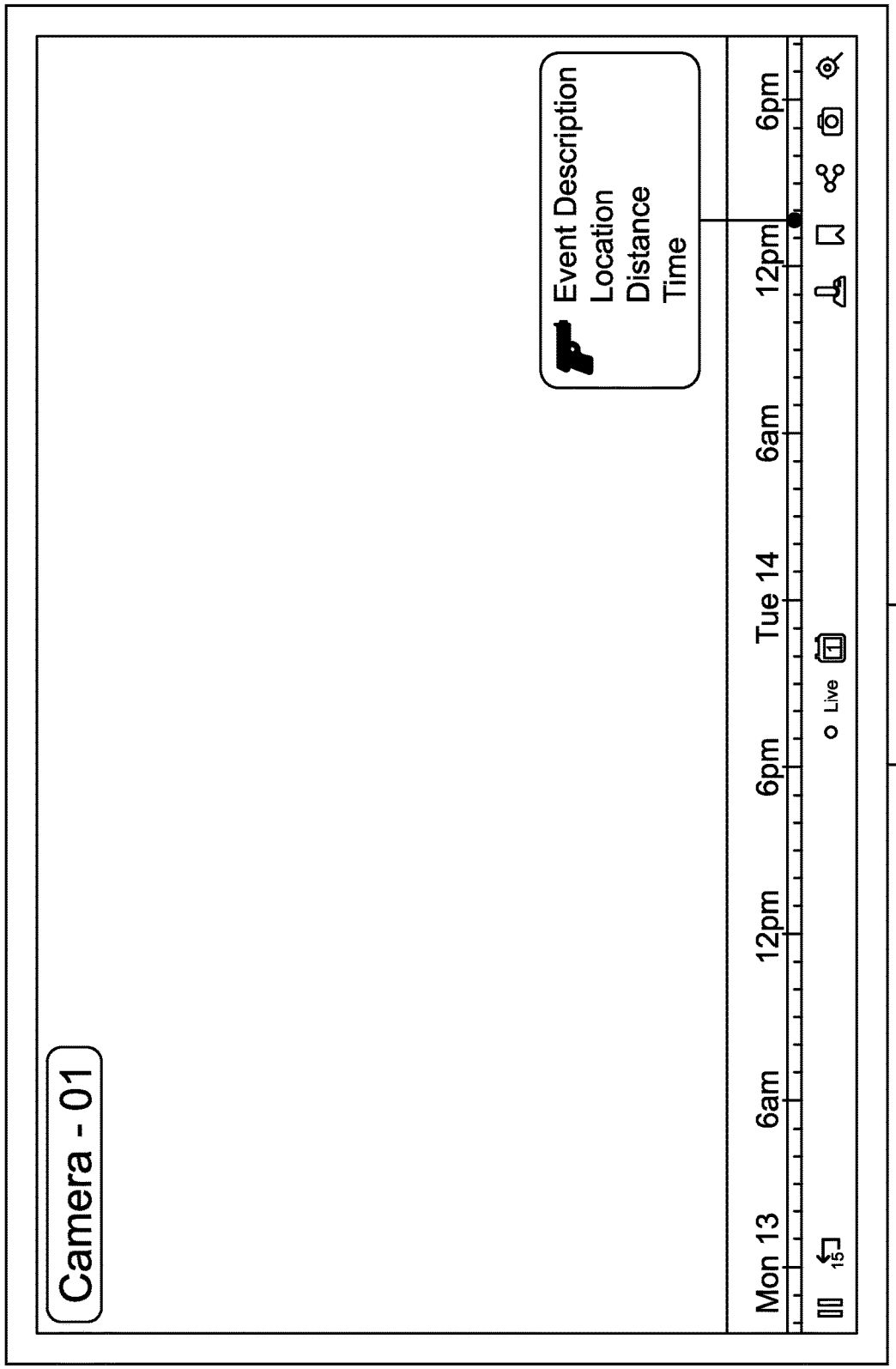
FIG. 15A is a drawing of an exemplary graphical user interface displaying a video feed, showing a first position of a sixth transitional sequence illustrating a digital map appearing next to a graphical user interface element related to a video feed following a selection of the graphical user interface element displayed with respect to the video feed, a graphical user interface element visible with respect to the video feed.
Figure 15B:
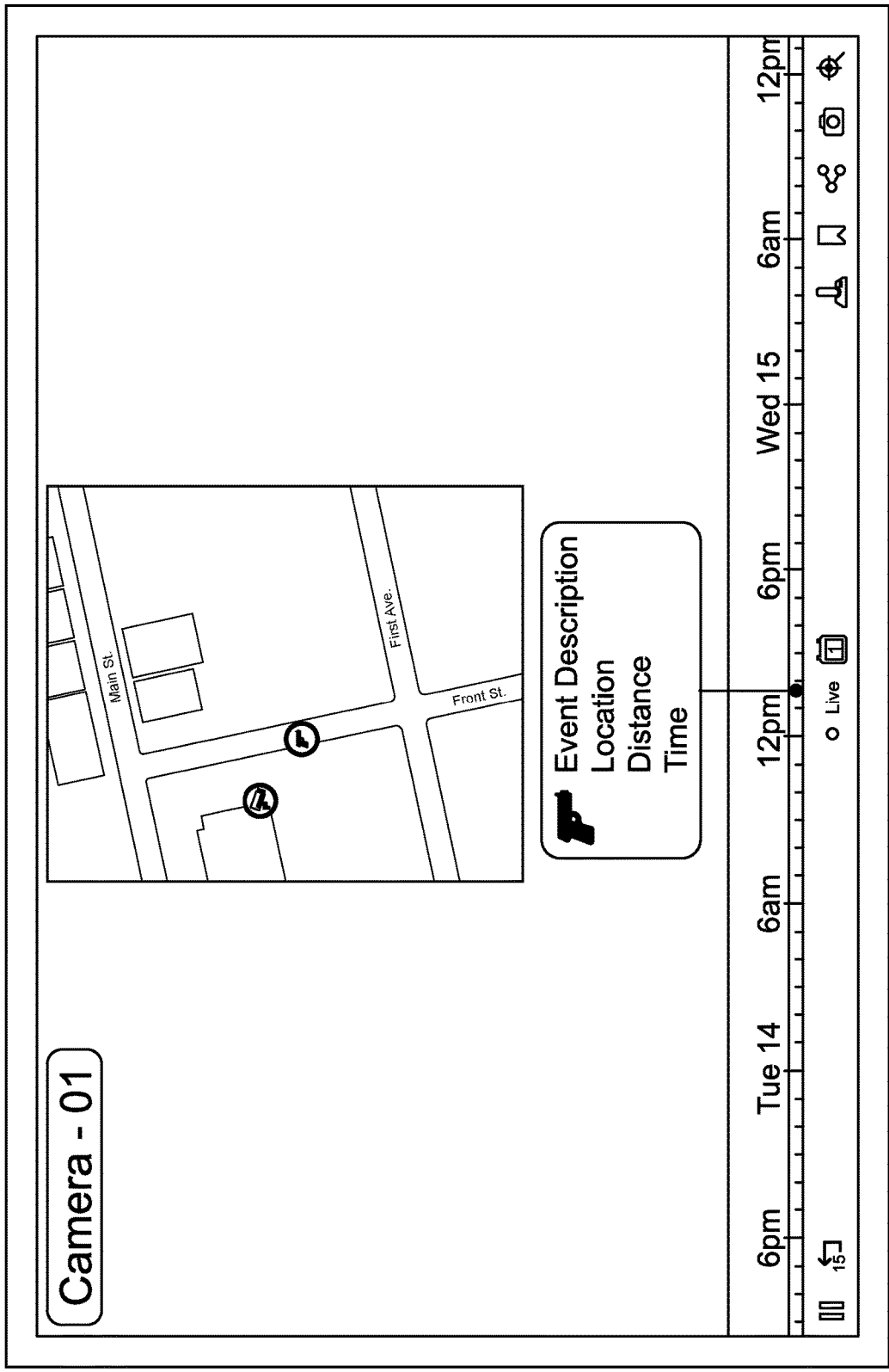
FIG. 15B is a drawing of an exemplary graphical user interface displaying a video feed, showing a second position of the sixth transitional sequence illustrating a digital map appearing next to a graphical user interface element related to a video feed following a selection of the graphical user interface element displayed with respect to the video feed, the digital map with the graphical user interface element displayed on the video feed next to the selected graphical user interface element, the digital map including a graphical user interface element corresponding to the event of the selected graphical user interface element on the video feed.

In some instances, a digital map may be permanently visible on the graphical user interface (e.g. as a thumbnail or in small), where the prompt to display the second graphical user interface element results in an expansion of the space occupy by the digital map, the resolution of and quantity of information presented on the digital map increasing following the expansion of the dimensions of the digital map. In some instances, the digital map may appear as a small window or as a pop-up or thumbnail next to the graphical user interface element displayed with respect to the video feed, as illustrated by the sequence of states of the graphical user interface of FIGS. 15A-15B. The digital map may be visible as long as the graphical user interface element is visible on the video feed. Receiving selection input of the digital map may cause the digital map to enlarge on the graphical user interface (in some examples, occupying the entire graphical user interface).

Figure 10A:
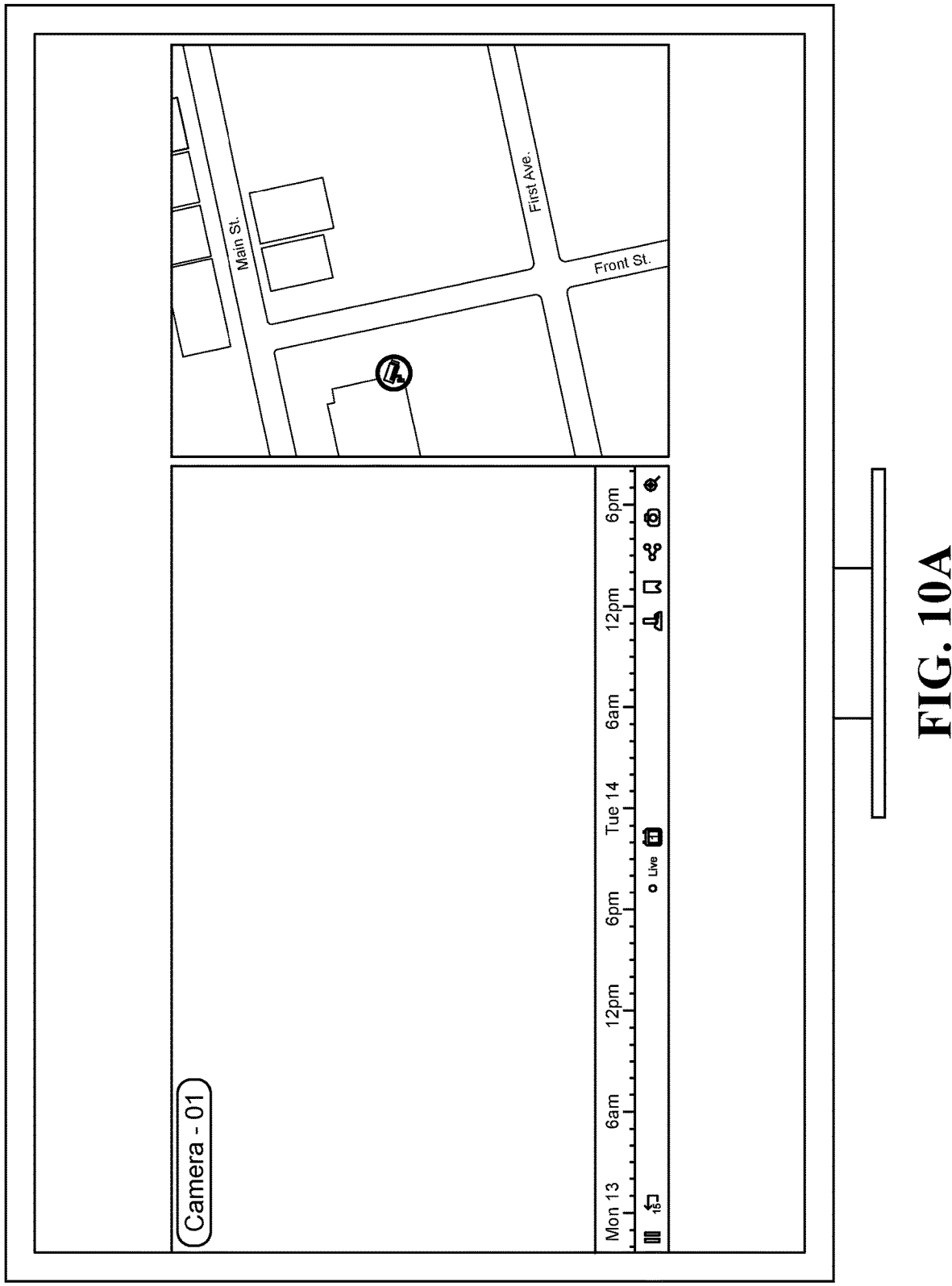
FIG. 10A is a drawing of an exemplary graphical user interface displaying a video feed next to a digital map, showing a first position of a first transitional sequence illustrating a graphical user interface element displayed with respect to the video feed concurrently with the displaying of a graphical user interface element on the digital map, a graphical user interface element not yet visible on the digital map or with respect to the video feed.
Figure 10B:
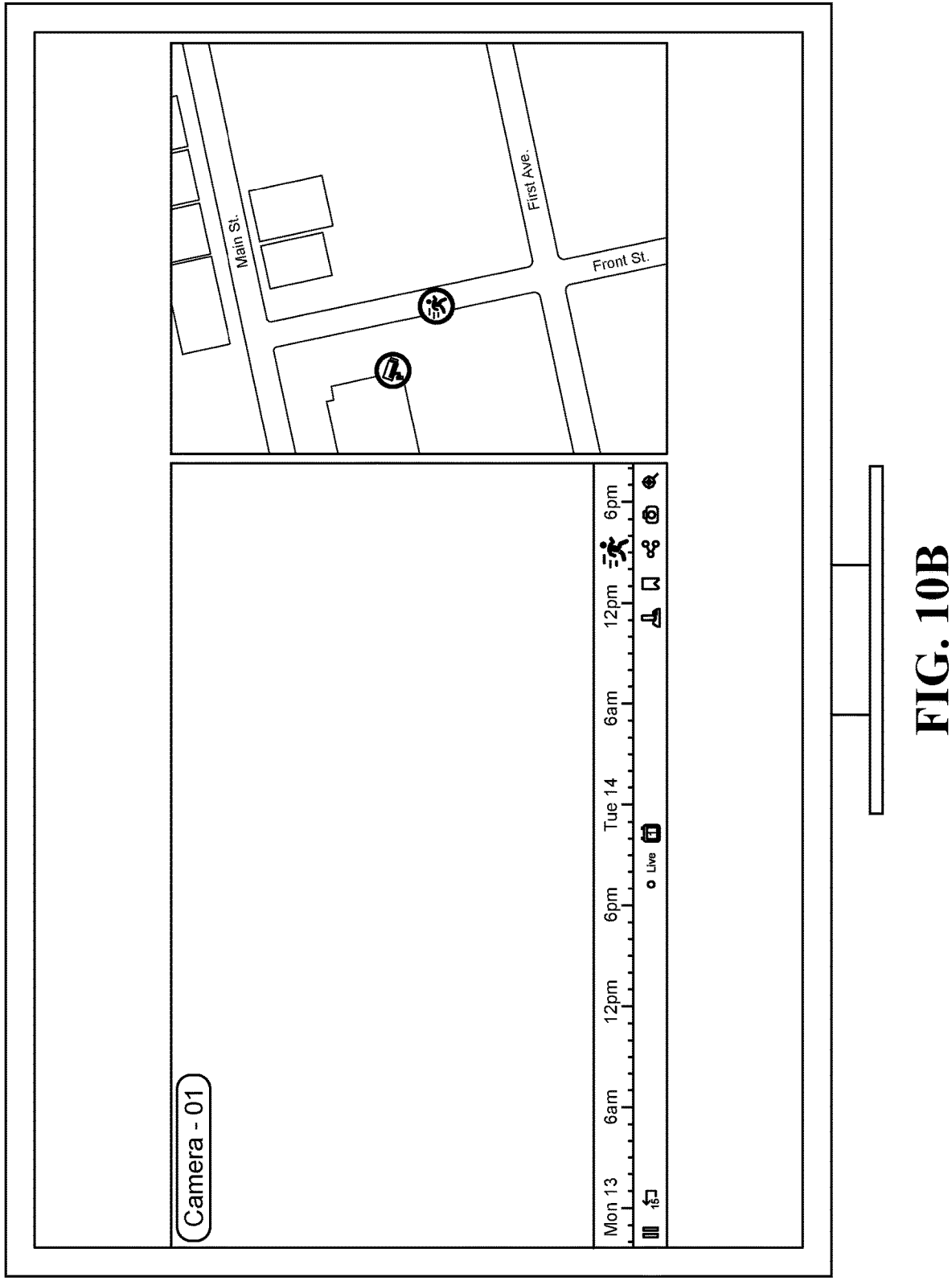
FIG. 10B is a drawing of an exemplary graphical user interface displaying a video feed next to a digital map, showing a second position of the first transitional sequence illustrating a graphical user interface element displayed with respect to the video feed concurrently with the displaying of a graphical user interface element on the digital map, the graphical user interface element displayed on the digital map or with respect to the video feed.
Figure 10C:
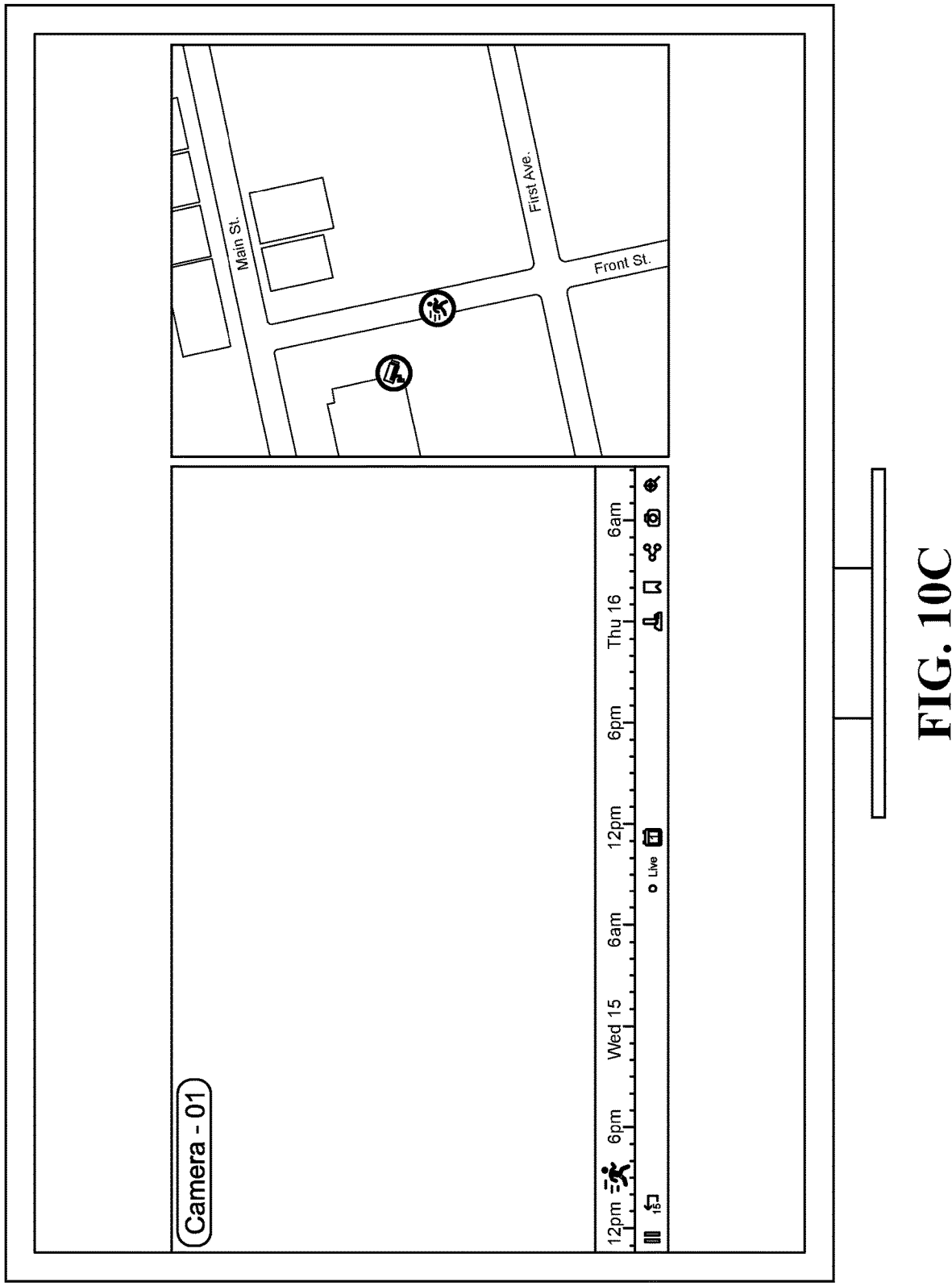
FIG. 10C is a drawing of an exemplary graphical user interface displaying a video feed next to a digital map, showing a third position of the first transitional sequence illustrating a graphical user interface element displayed with respect to the video feed concurrently with the displaying of a graphical user interface element on the digital map, the graphical user interface element still visible on the digital map or with respect to the video feed, the graphical user interface element moving in accordance with the progress of the video timeline.
Figure 10D:
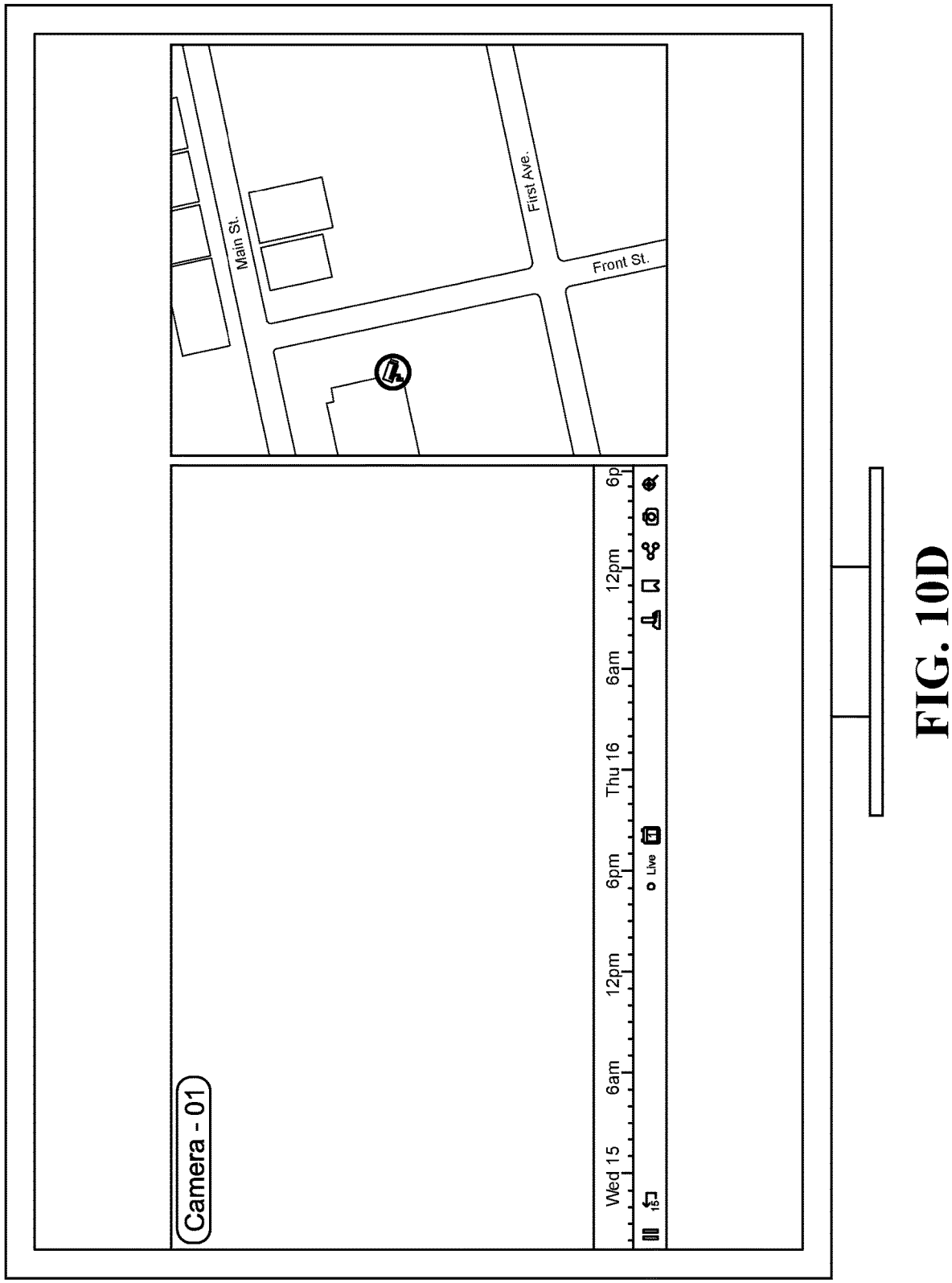
FIG. 10D is a drawing of an exemplary graphical user interface displaying a video feed next to a digital map, showing a fourth position of the first transitional sequence illustrating a graphical user interface element displayed with respect to the video feed concurrently with the displaying of a graphical user interface element on the digital map, the graphical user interface element no longer visible on the digital map or with respect to the video feed.
Figure 13A:
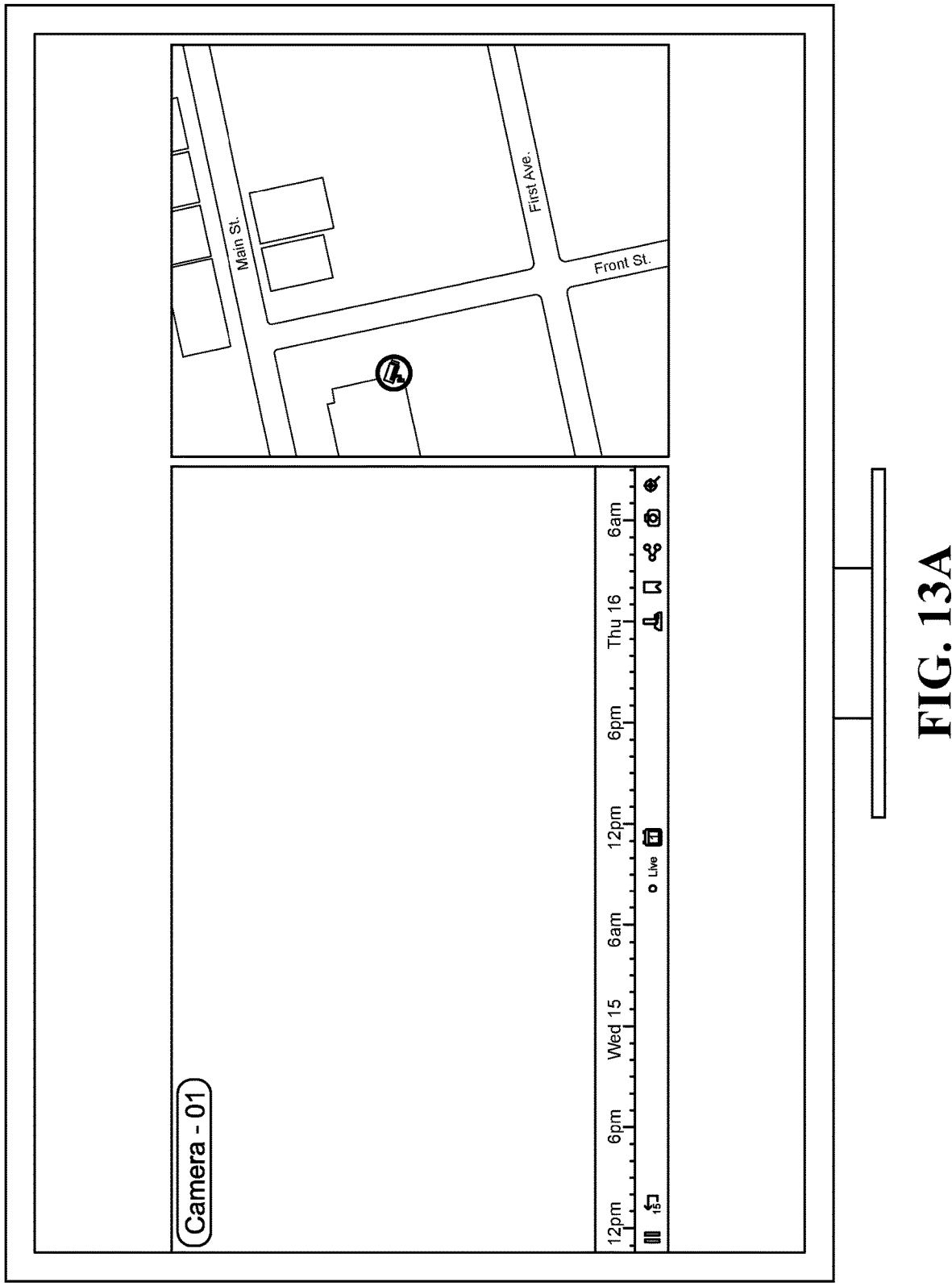
FIG. 13A is a drawing of an exemplary graphical user interface displaying a video feed next to a digital map, showing a first position of a fourth transitional sequence illustrating a graphical user interface element being displayed with respect to the video feed before the digital map, a graphical user interface element visible not yet displayed on the digital map and with respect to the video feed.
Figure 13B:
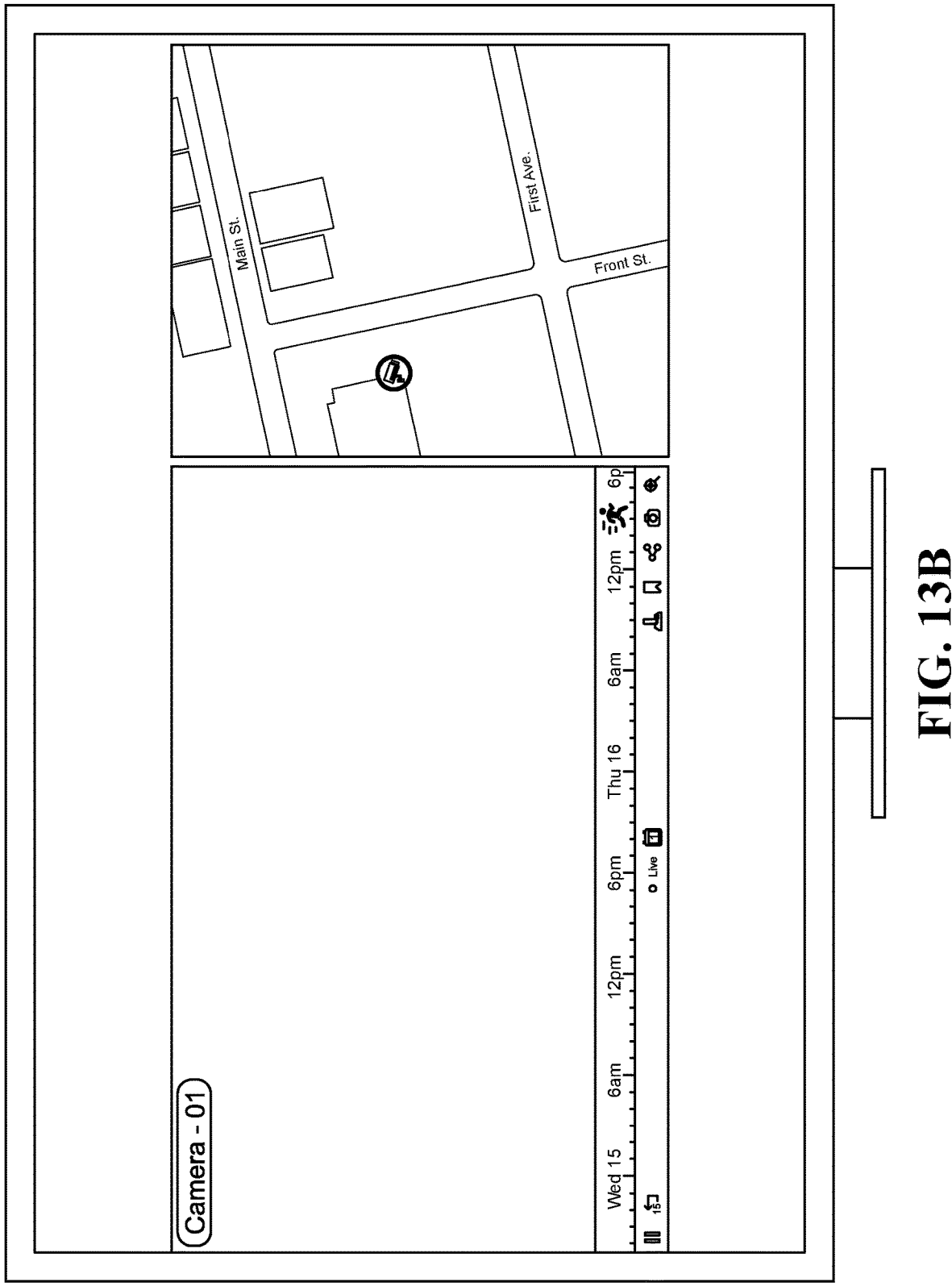
FIG. 13B is a drawing of an exemplary graphical user interface displaying a video feed next to a digital map, showing a second position of the fourth transitional sequence illustrating a graphical user interface element being displayed with respect to the video feed before the digital map, a graphical user interface element visible with respect to the video feed but not yet on the digital map.
Figure 13C:
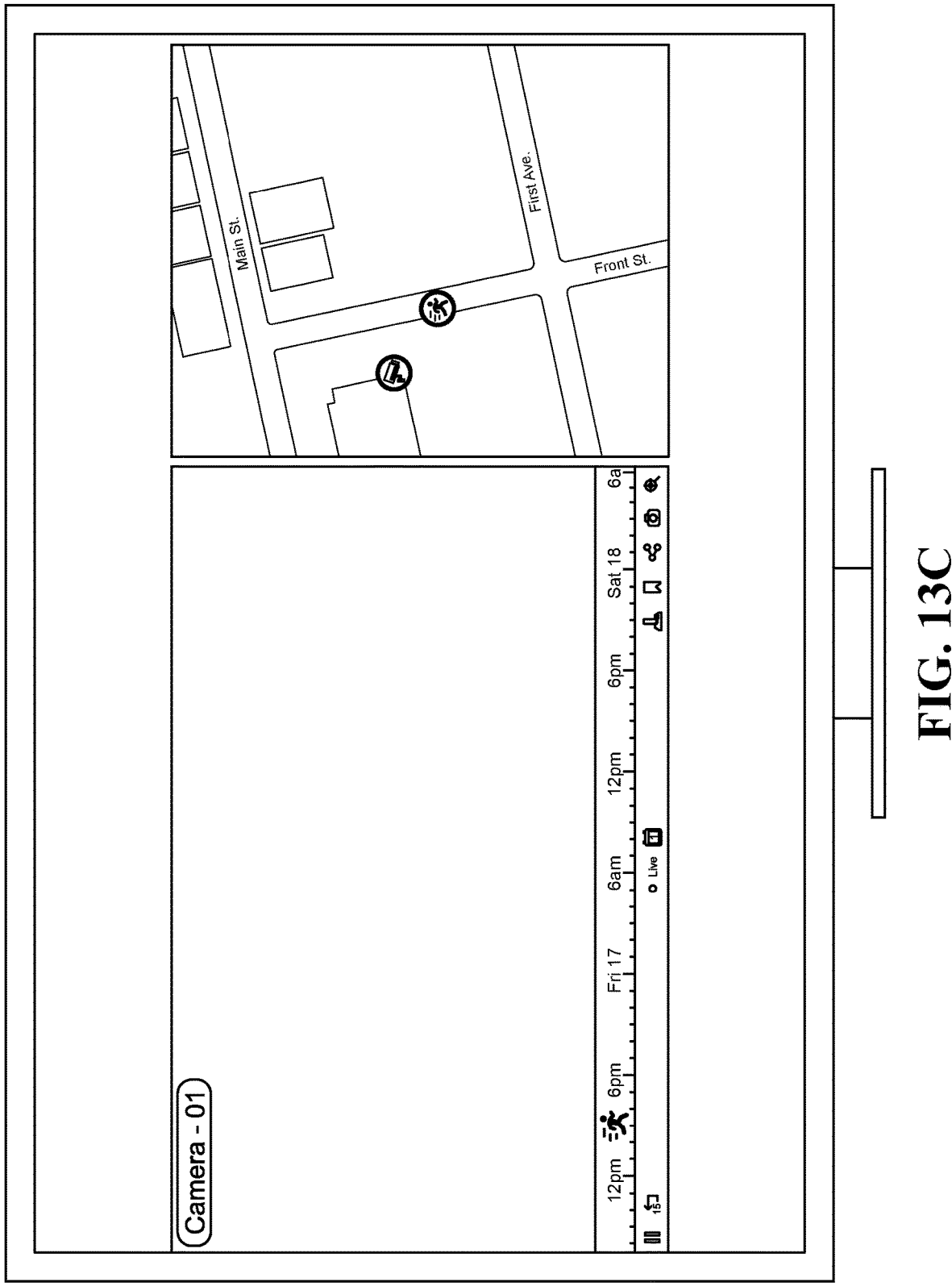
FIG. 13C is a drawing of an exemplary graphical user interface displaying a video feed next to a digital map, showing a third position of the fourth transitional sequence illustrating a graphical user interface element being displayed with respect to the video feed before the digital map, a graphical user interface element visible on both the digital map and with respect to the video feed.

In some instances, input may be received to zoom in or zoom out of the video progress indicator. Zooming in may decrease the amount of time displayed on the video progress indicator and zooming out may increase the amount of time displayed on the video progress indicator. The amount of time the second graphical user interface element appears on the digital map may depend on the amount of time displayed on the video progress indicator, e.g. where the second graphical user interface element is only visible as long as the first graphical user interface element appears with respect to the video progress indicator (the first graphical user interface element shifting along with the video progress indicator as the video progress indicator scrolls from one side of the graphical user interface to the other with the progress of the video feed). The second graphical user interface element may be visible on the digital map as long as the first graphical user interface is visible with respect to the video progress indicator, as illustrated by the sequence of states of the graphical user interface of FIGS. 13A-13C. Similarly, as illustrated by the sequence of states of the graphical user interface of FIGS. 10A-10C, the second graphical user interface element may be removed from the digital map when the first graphical user interface element scrolls off of the graphical user interface, following movement of the video progress indicator.

In some embodiments, one or more additional graphical user interface elements may be displayed on the digital map at step 460, corresponding respectively to one or more cameras or detector devices (e.g. microphones; motion detectors; radars, etc.), the location of each additional graphical user interface element on the digital map corresponding to a geographical location of the corresponding detector device or camera.

The additional graphical user interface element may include an icon symbolizing the camera or detector device. The additional graphical user interface element may be framed with a shape (e.g. a circle, a due drop, a balloon, etc.)

In some embodiments, user input may be received within the additional graphical user interface element, for selecting the additional graphical user interface element. When the additional graphical user interface element corresponds to a camera, receipt of the selection input may cause the display of a video feed that has been generated by the camera corresponding to the selected additional graphical user interface element (in real-time, or pre-recorded). In an example when the additional graphical user interface element corresponds to a microphone, receipt of the selection input may cause the playback of the audio signal picked up by the microphone (in real time, pre-recorded). It will be understood that the receipt of selection input of the additional graphical user interface element may cause the display or transmission of information originating from the detector device or camera corresponding to the selected additional graphical user interface element.

In some embodiments, user input may be received within the second graphical user interface element, selecting the second graphical user interface element at step 470. The user input may be provided using one or more I/O devices, such as a mouse, a touchscreen, a keyboard, a microphone, a motion sensor, etc. The user input may include, but is not limited to, a button-press of a mouse, a button-press of a keyboard, a press on a touchscreen, a voice command captured by a microphone, a motion captured by a motion sensor leading to a selection of a video stream tile, eye motion captured by a vision tracker directed towards the selected video stream tile, or a combination thereof. In some instances, the user input may be moving a cursor over, or hovering over, the second graphical user interface element. In some instances, the user input may be a selection of the event indicator of the second graphical user interface element.

In other embodiments, no user input may be received, where the displaying of a video feed is instead triggered by the passing of time calculated from the display of the first graphical user interface element, or the second graphical user interface, on the graphical user interface. The video feed may be displayed after the lapse of a period of time (i.e. fulfillment of a time condition) following the displaying of the second graphical user interface element.

The video feed is then displayed on the graphical user interface at step 480, along with the video progress indicator. The video feed and the video progress indicator may occupy the same regions of the graphical user interface as those defined at step 420 (i.e. the first region and the second region). In some examples, the video feed and the video progress indicator may occupy different regions of the graphical user interface.

In some embodiments, user input may be received to adjust the dimensions of the first region, the second region and/or the space occupied by the digital map (e.g. by receiving selecting and dragging user input for one of the corners of first region, the second region and/or the space occupied by the digital map).

In some embodiments, the displaying of the first graphical user interface element at step 430 and the displaying of the second graphical user interface at step 450 may occur simultaneously, as illustrated by the sequence of states of the graphical user interface of FIGS. 10A-10D (where no user input is required for causing the displaying of the second graphical user interface element at step 450).

In some instances, the period during which the first graphical user interface element and the second graphical user interface are displayed corresponds to a duration of the event (when the event has a start time and a finish time).

In some instances, the displaying of the first graphical user interface element at step 430 and/or the displaying of the second graphical user interface at step 450 may occur at a predetermined time prior to the occurrence of the event.

Figure 12A:
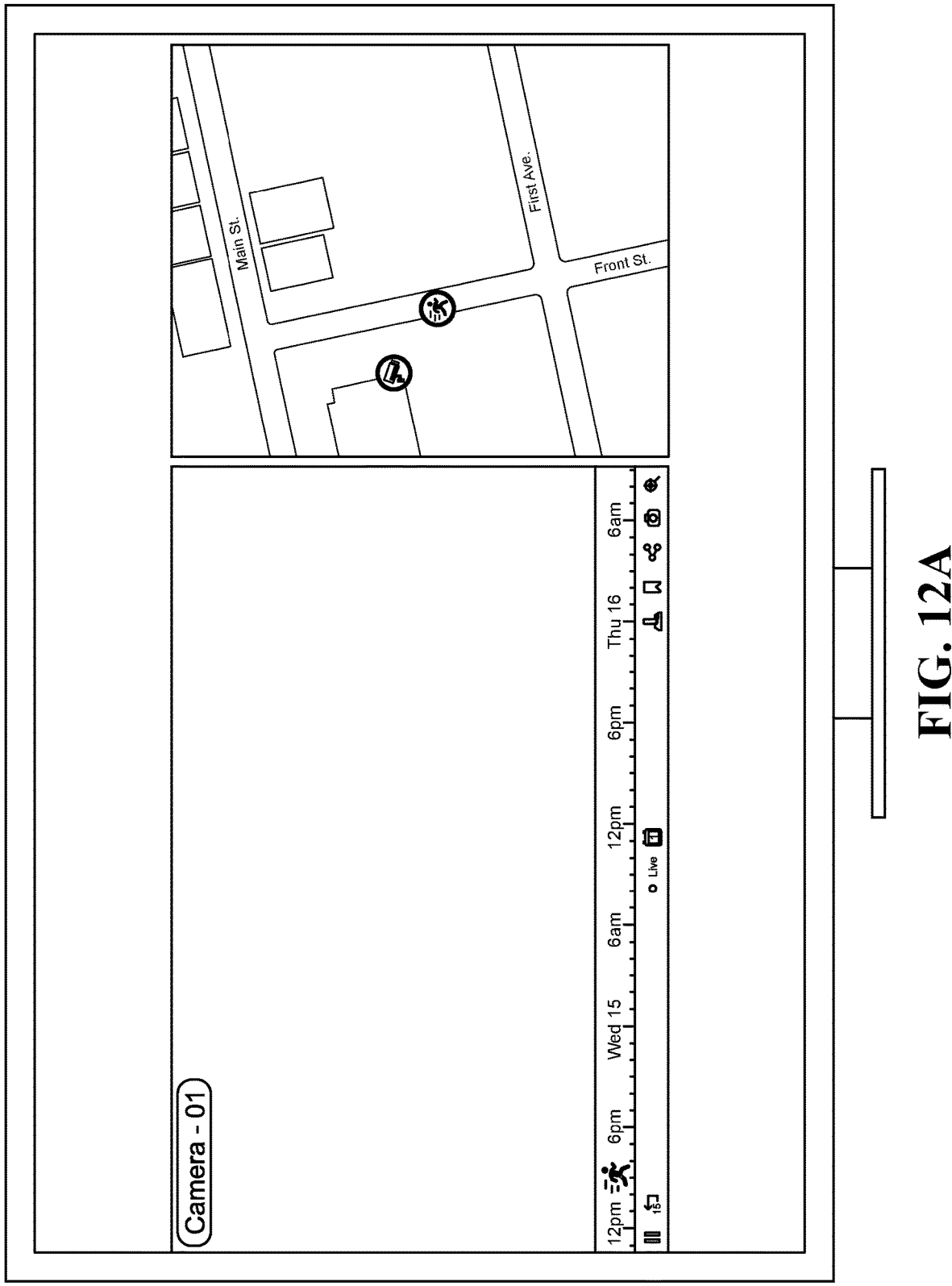
FIG. 12A is a drawing of an exemplary graphical user interface displaying a video feed next to a digital map, showing a first position of a third transitional sequence illustrating a graphical user interface element being removed from the video feed before being removed from the digital map, a graphical user interface element visible on the digital map and with respect to the video feed.
Figure 12B:
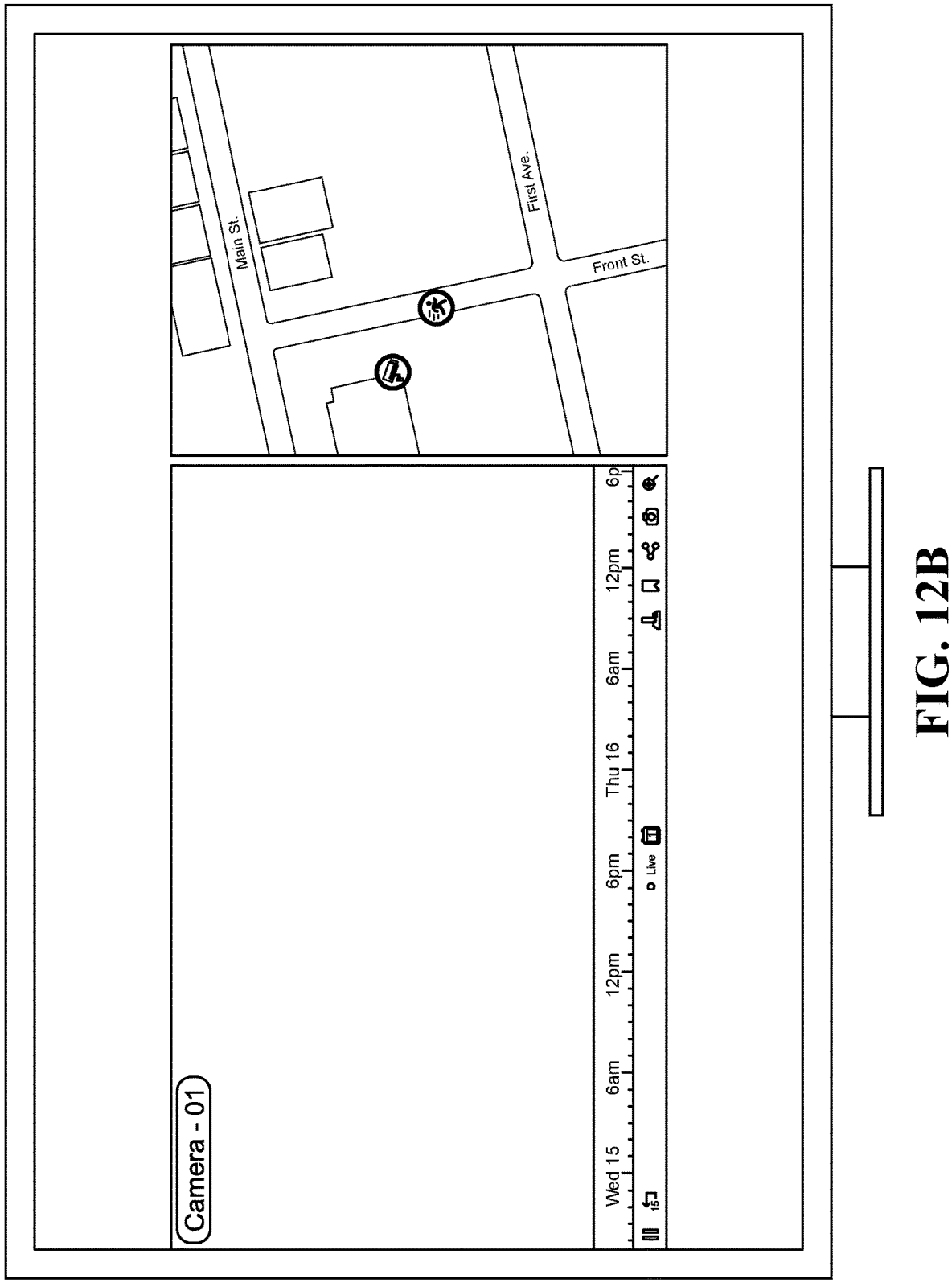
FIG. 12B is a drawing of an exemplary graphical user interface displaying a video feed next to a digital map, showing a second position of the third transitional sequence illustrating a graphical user interface element being removed from the video feed before being removed from the digital map, the graphical user interface element visible on the digital map but removed from the video feed.
Figure 12C:
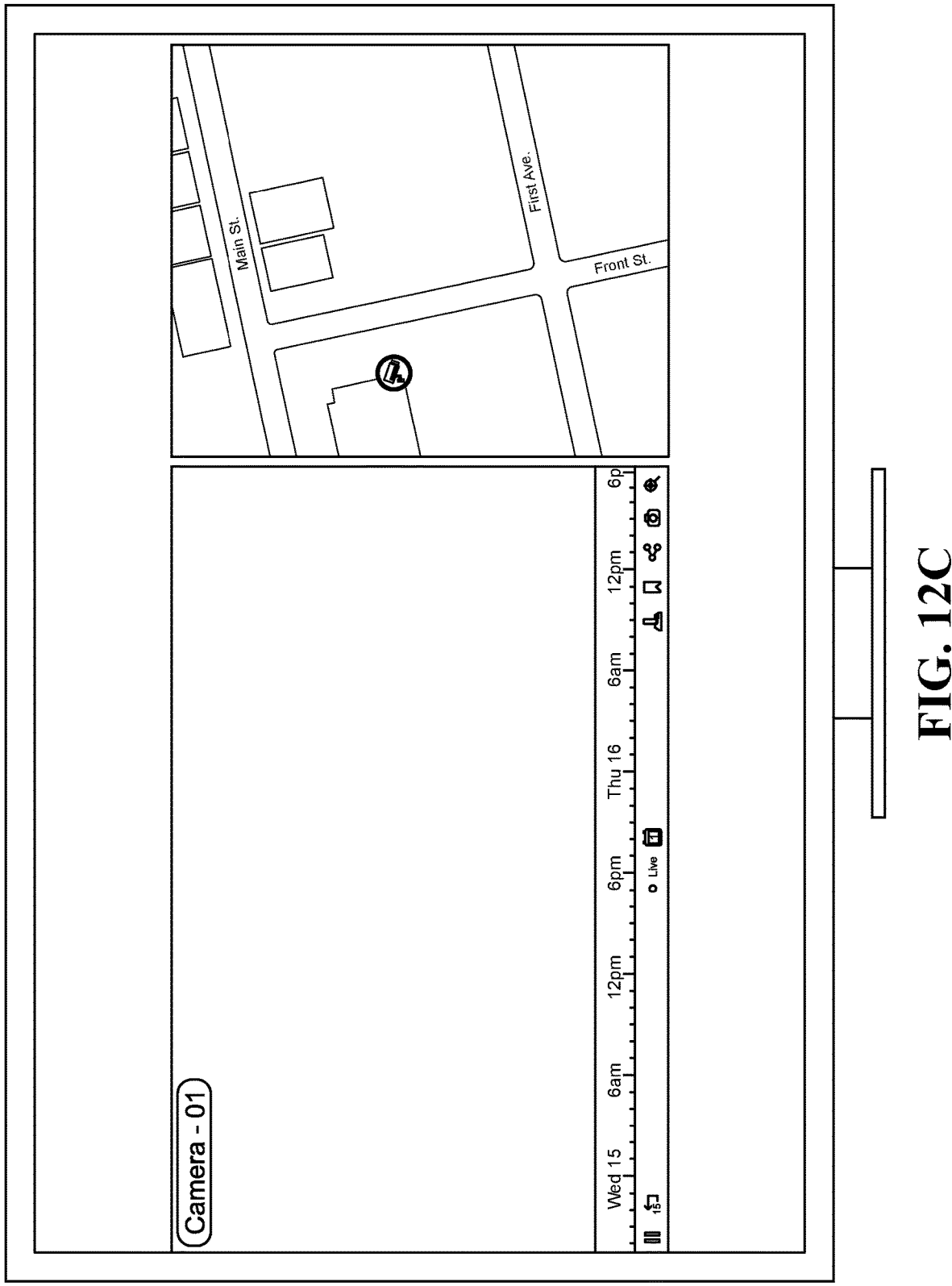
FIG. 12C is a drawing of an exemplary graphical user interface displaying a video feed next to a digital map, showing a third position of the third transitional sequence illustrating a graphical user interface element being removed from the video feed before being removed from the digital map, the graphical user interface element removed from both the digital map and the video feed.
Figure 14A:
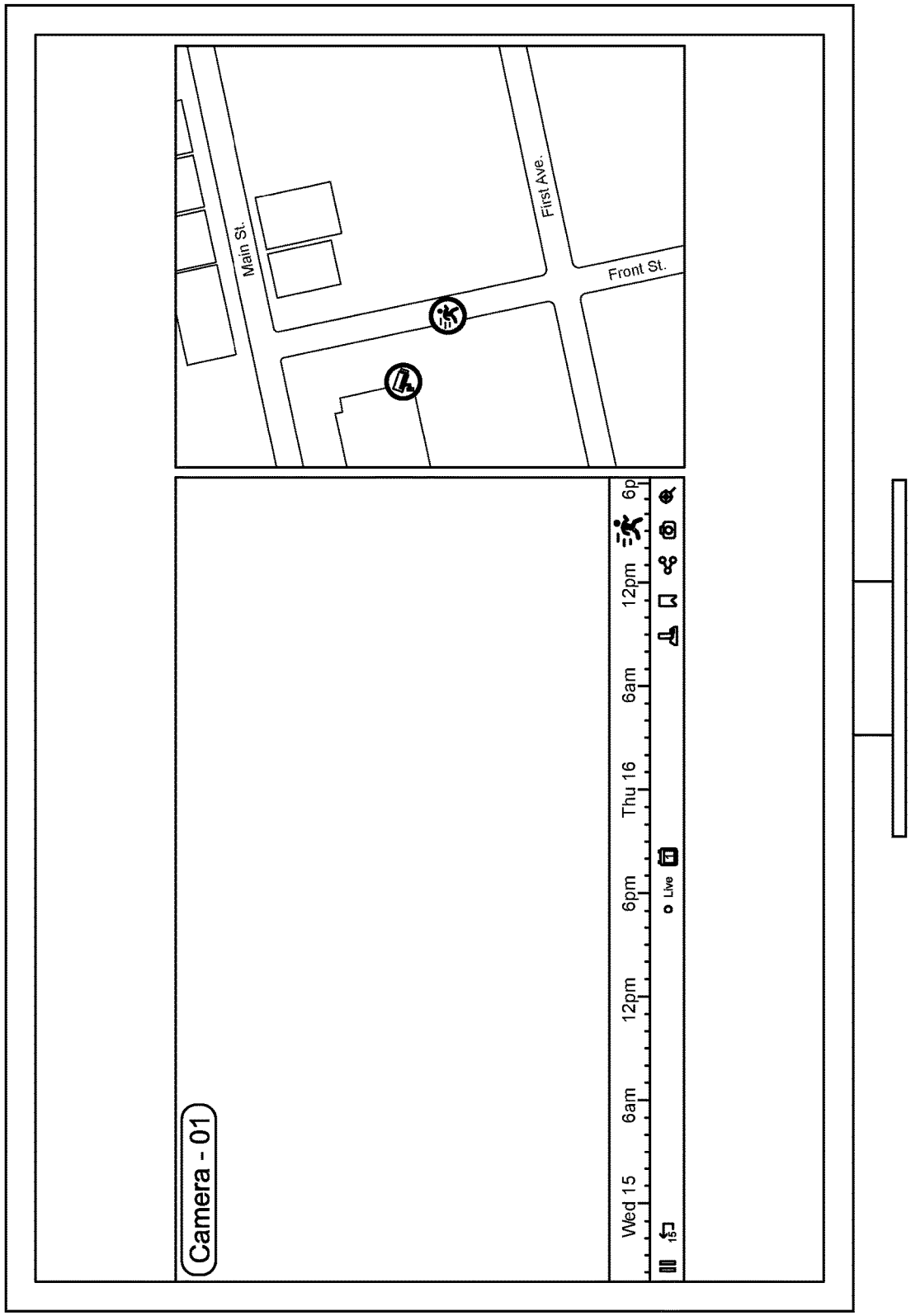
FIG. 14A is a drawing of an exemplary graphical user interface displaying a video feed next to a digital map, showing a first position of a fifth transitional sequence illustrating a graphical user interface element being removed from the digital map before being removed with respect to the video feed, a graphical user interface element visible on the digital map and with respect to the video feed.
Figure 14B:
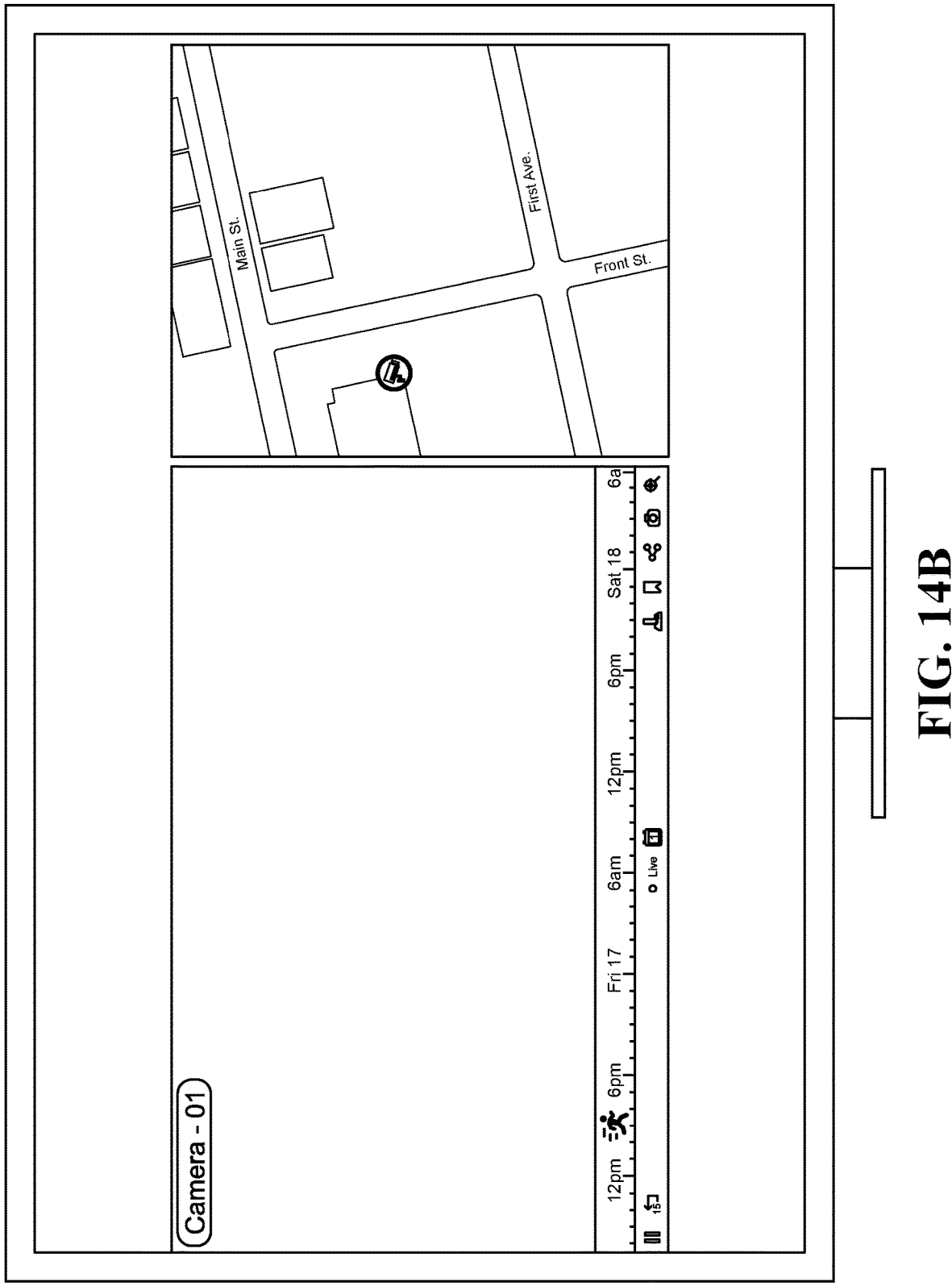
FIG. 14B is a drawing of an exemplary graphical user interface displaying a video feed next to a digital map, showing a second position of the fifth transitional sequence illustrating a graphical user interface element being removed from the digital map before being removed with respect to the video feed, the graphical user interface element removed from the digital map but still displayed on the video feed.
Figure 14C:
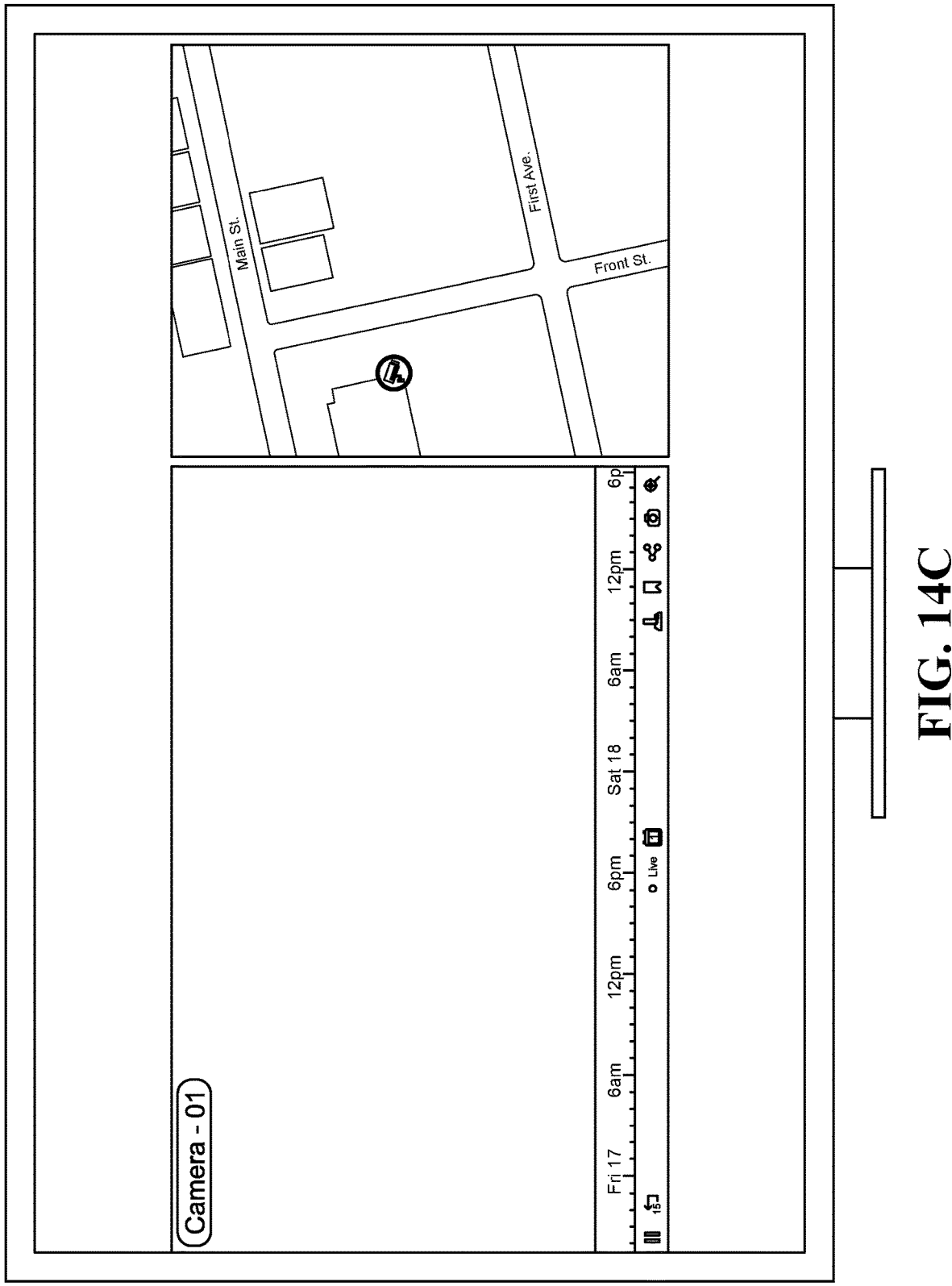
FIG. 14C is a drawing of an exemplary graphical user interface displaying a video feed next to a digital map, showing a third position of the fifth transitional sequence illustrating a graphical user interface element being removed from the digital map before being removed with respect to the video feed, the graphical user interface element removed from the digital map and with respect to the video feed.

In some embodiments, the method 400 may further include the removal of the first graphical user interface element and of the second graphical user interface element following the lapse of a period following the display of the first graphical user interface element or the second graphical user interface element, or the occurrence or the end of the event corresponding to the first graphical user interface element or the second graphical user interface element. In some instances, the removal of the first graphical user interface may occur prior to the removal of the second graphical user interface element, as illustrated by the sequence of states of the graphical user interface of FIGS. 12A-12C. In some instances, the removal of the second graphical user interface element from the digital map may occur before being removed with respect to the video feed, as illustrated by the sequence of states of the graphical user interface of FIGS. 14A-14C.

Figure 6:
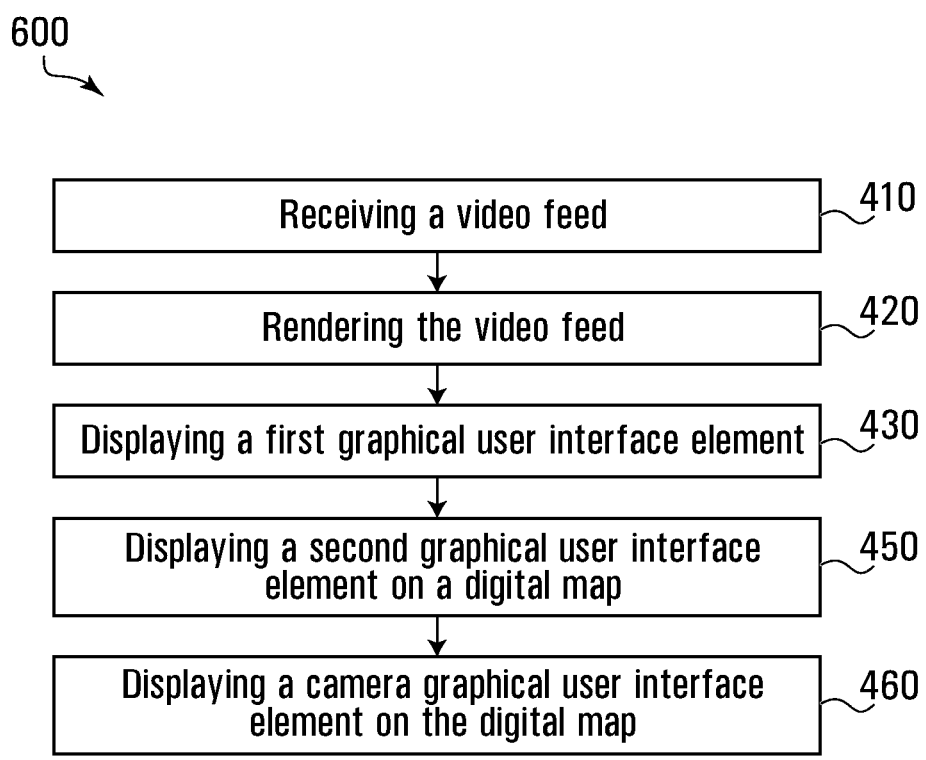
FIG. 6 is a flowchart diagram of another exemplary method of rendering a digital map from an input within a graphical user interface element displayed in association with a video feed on a graphical user interface.

In some embodiments, as shown in FIG. 6, the method of rendering a digital map from an input within a graphical user interface element displayed in association with a video feed on a graphical user interface may be performed without receiving user input, as illustrated by method 600. Steps 410, 420, 430, 450 and 460 of method 600 correspond to the steps 410, 420, 430, 450 and 460 of method 400, these steps of method 600 not requiring user input.

Figure 5:
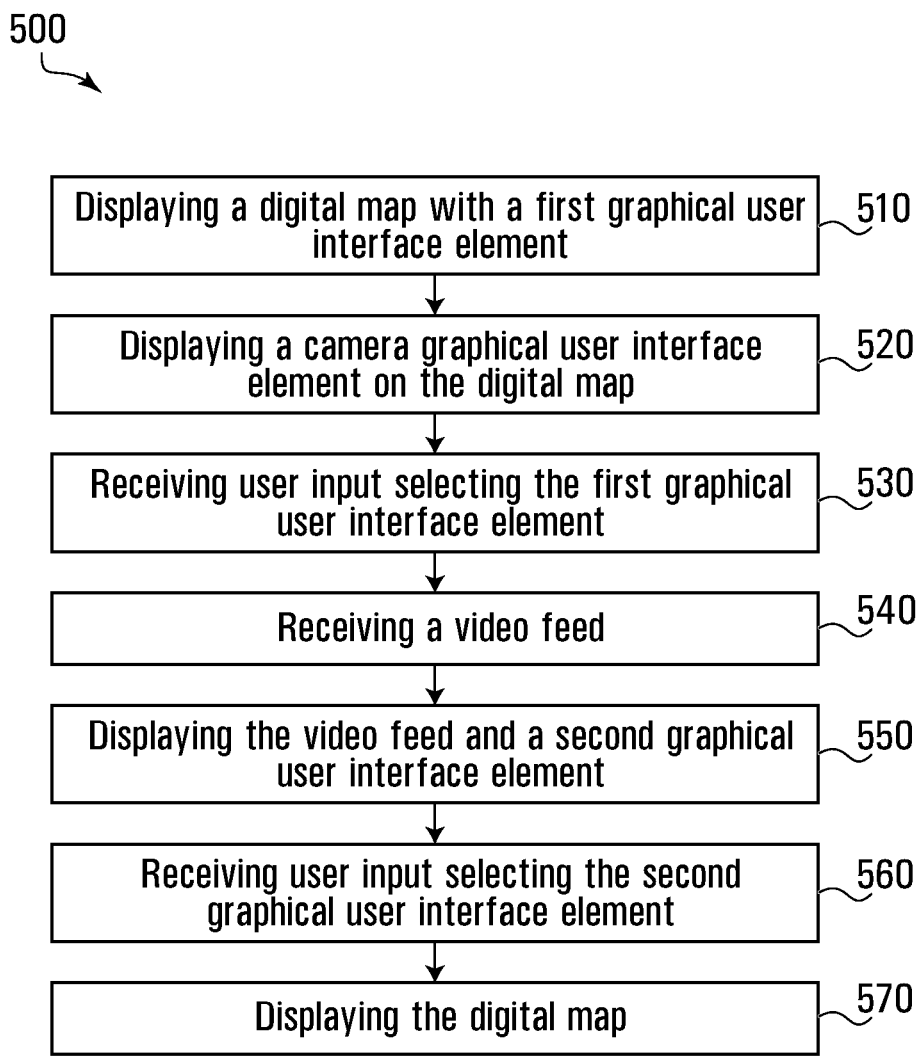
FIG. 5 is a flowchart diagram of an exemplary method of displaying a video feed from input within a graphical user interface element displayed on a digital map displayed on a graphical user interface.

Exemplary Method of Displaying a Video Feed from Input within a Graphical User Interface Element Displayed on a Digital Map:

Reference is now made to FIG. 5, illustrating an exemplary method 500 of displaying a video feed from input within a graphical user interface element displayed on a digital map displayed on a graphical user interface. The method may be performed by the computing device 110.

A digital map is displayed on the graphical user interface viewable on the display of a computing device at step 510. A first graphical user interface element with an event indicator is displayed on the digital map (e.g. graphical user interface element 203B as illustrated on FIG. 3). An exemplary digital map with an exemplary first graphical user interface element is illustrated at FIG. 3. The first graphical user interface element is associated with an event having a time and a geographical location.

The first graphical user interface element appears at a location on the digital map corresponding to the geographical location of an event associated with the first graphical user interface element, thereby providing a visual queue to the user of the location of the event. The geographical location may be the location at which the event took place (e.g. the GPS coordinates of the location where an emergency call was placed; the GPS coordinates of a stolen vehicle when the vehicle has GPS positioning, etc.). The geographical location of the event may be a location of the detector device (such as a microphone for a gunshot) or of the camera that has picked up on, or is the source of, the event.

In some instances, the occurrence records or event information may be received (e.g. at the system 106) in real-time or in near real-time, which causes the first graphical user interface element to appear on the digital map.

The first graphical user interface element may appear at a time corresponding to the time of the event. The time corresponding to the time of the event may be, e.g., the real-time occurrent of the event, or the playback time of the event on the video feed and/or the digital map. The first graphical user interface element may remain visible on the digital map for a period of time following the time of the appearance of the first graphical user interface element on the digital map.

In some instances, the event indicator of the first graphical user interface element may be an icon. A determination of an event type of the event corresponding to the first graphical user interface element may be made. The selection of an appropriate icon can be based on the determination of the event type of the event, where the icon symbolizes the event type, providing the user with a visual queue as to the nature of the event corresponding with the first graphical user interface element. For instance, if the event type is that of a fire, the icon may be that of a flame. For instance, if the event type is that of a robbery, the icon may be that of a person running.

In some embodiments, one or more additional graphical user interface elements may be displayed on the digital map at step 520, corresponding respectively to one or more cameras or detector devices (e.g. microphones; light detectors; radars, etc.), the location of each additional graphical user interface element on the digital map corresponding to a geographical location of the corresponding detector device or camera.

The additional graphical user interface element may include an icon symbolizing the camera or detector device. The additional graphical user interface element may be framed with a shape (e.g. a circle, a due drop, etc.)

In some embodiments, user input may be received within the additional graphical user interface element, for selecting the additional graphical user interface element. When the additional graphical user interface element corresponds to a camera, receipt of the selection input may cause the display of a video feed that has been generated by the camera corresponding to the selected additional graphical user interface element (in real-time, or pre-recorded). In an example where the additional graphical user interface element corresponds to a microphone, receipt of the selection input may cause the playback of the audio signal picked up by the microphone (in real time, pre-recorded) corresponding to the selected additional graphical user interface. It will be understood that the receipt of selection input of the additional graphical user interface element may cause the display or transmission of information originating from the detector device or camera corresponding to the selected additional graphical user interface element.

In some embodiments, user input may be received within the first graphical user interface element at step 530, using one or more user input devices, for displaying a video feed associated to the first graphical user interface element (e.g. of a camera that is in proximity to the geographical location of the event corresponding to the selected first graphical user interface element; of a video feed that has been labelled as being relevant for the event corresponding to the selected first graphical user interface element; etc.), as described at step 550. The user input may be provided using one or more I/O devices, such as a mouse, a touchscreen, a keyboard, a microphone, a motion sensor, etc. The user input may include, but is not limited to, a button-press of a mouse, a button-press of a keyboard, a press on a touchscreen, a voice command captured by a microphone, a motion captured by a motion sensor leading to a selection of a video stream tile, eye motion captured by a vision tracker directed towards the selected video stream tile, or a combination thereof. In some instances, the user input may be moving a cursor over, or hovering over, the first graphical user interface element. In some instances, the user input may be a selection of the event indicator of the first graphical user interface element.

In other embodiments, no user input may be received, where the displaying of the video feed is instead triggered by the appearance of the first graphical user interface element on the digital map and/or by the occurrence of the corresponding event (e.g., by receiving an occurrence record). The video feed may remain visible as long as the first graphical user interface element appears on the digital map.

A video feed generated by a camera is received at step 540. The receiving of the video feed at step 510 can be performed as described at step 410 of FIG. 4. The video feed can be selected based on the user input and/or the occurrence of the event and its proximity to the camera capturing the video feed.

A second graphical user interface element is then displayed on a video feed or video progress indicator, the second graphical user interface element including the event indicator of the first graphical user interface element at step 550. The terms "first" and "second" before the "first graphical user interface element" and "second graphical user interface element" as used herein are labels to distinguish between two different graphical user interface elements. The order in which the graphical user interface elements is not necessarily implied by the use of "first" and "second". While in some embodiments, the first graphical user interface element may appear before the second graphical user interface element, in other embodiments, the converse occurs. In some embodiments, the first graphical user interface element and second graphical user interface element appear at the same time or at substantially the same time.

The second graphical user interface element may appear on the video feed or the video progress indicator at a position corresponding to the time of the event. For instance, when the video progress indicator includes a video timeline, the second graphical user interface element may mark a time on the video timeline (e.g. be positioned on the video timeline at an appropriate position) corresponding to the time of the event. In some embodiments, the second graphical user interface element may appear on the video feed or the video progress indicator for a given period of time before and after the time of the event. In one embodiment, as the time markings on the video timeline shift gradually to illustrate the passage of time of the video feed, the second graphical user interface element appearing on the video timeline may shift with the time markings. For instance, if the time markings first appear at the right of the graphical user interface and then translate over to the left of the graphical user interface before disappearing, making room for new time markings to illustrate the passage of time, the second graphical user interface element appearing on the video timeline or associated with a time marking may follow the same movement, shifting from right to left of the graphical user interface, shifting with the progression of the video progress indicator.

When the video feed has been pre-recorded, the video feed data for generating the video feed may include metadata for identifying a time in a progress of the video feed when an event took place. The metadata may include information on the event, such as an event type of the event, a geographical location of the event type, etc. In some embodiments, the metadata can be used to determine a presence of an event, with respect to a video feed, prior to its playback time in the video feed to allow a graphical user interface element related to the event to be displayed for a time prior to the occurrence of the event. A time difference between the current playback time and the event time may be calculated (e.g. a set variable), and when the time difference is below a threshold, then the graphical user interface element relating to the event may be displayed with respect to the video feed.

The video feed may be streamed in real-time or near real time. In some embodiments, the video feed may be received from the camera at the computing device that is displaying the video feed, which may be live or pre-recorded video.

The video feed occupies a first region of the graphical user interface and the video progress indicator occupies a second region of the graphical user interface.

The generating of the video feed and of the video progress indicator may result in the video feed and the video progress indicator obscuring the space of the graphical user interface previously occupied by the digital map (e.g. where the video feed and the video progress indicator is located in a window of the graphical user interface laid over the digital map). In some embodiments, the video feed and the video progress indicator may occupy the entire graphical user interface, as illustrated in FIGS. 2A and 2B, entirely obscuring or replacing the digital map on the graphical user interface.

In some examples, despite the display of the video feed and the video progress indicator, the digital map may still occupy a third region of the graphical user interface, independent from the first region and the second region. In some examples, the first region and/or the second region may occupy a part of the space previously occupied by the digital map on the graphical user interface.

Figure 17A:
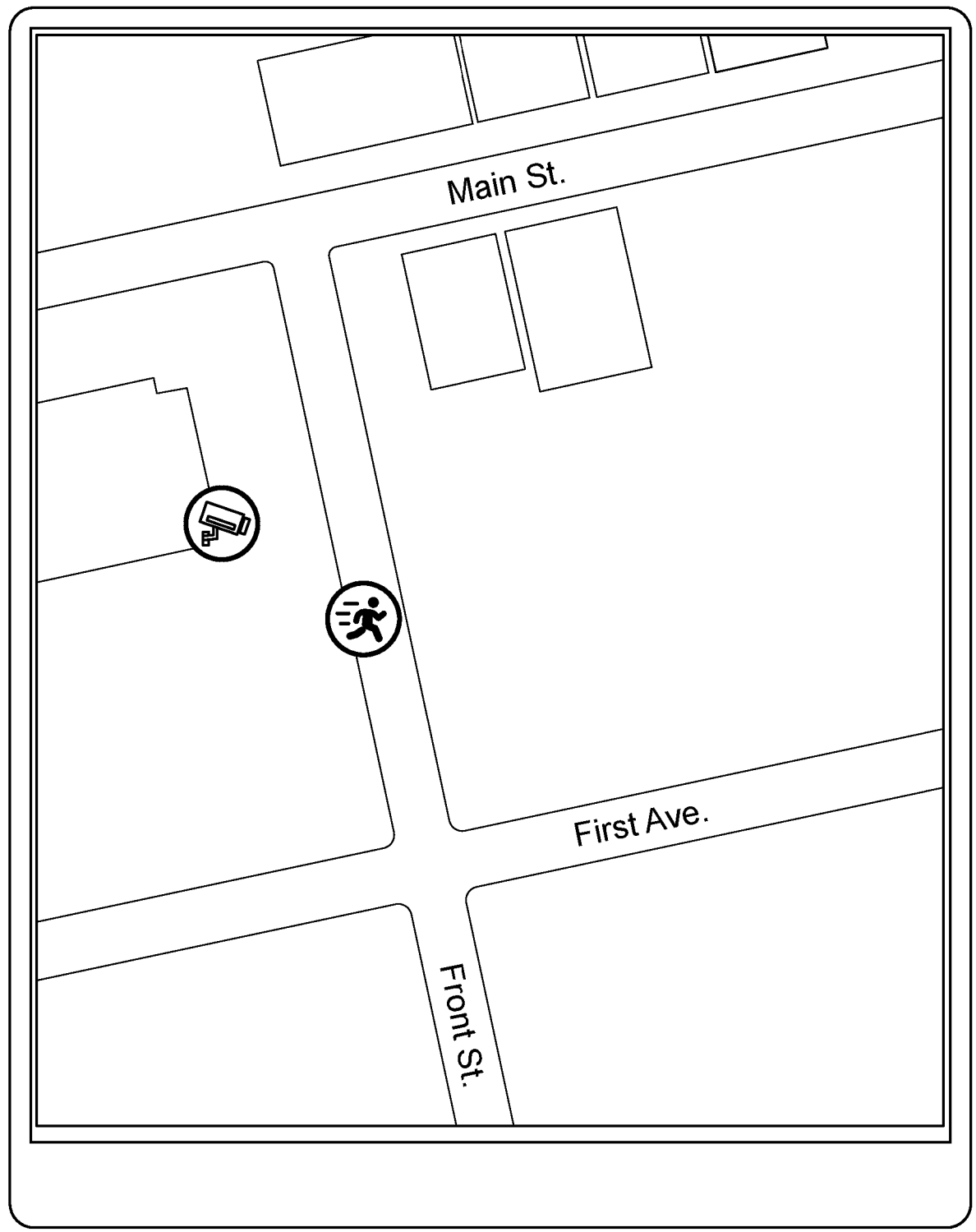
FIG. 17A is a drawing of an exemplary graphical user interface displaying a digital map, showing a first position of a seventh transitional sequence illustrating a video feed appearing next to a graphical user interface element and related to the graphical user interface element following a selection of the graphical user interface element, a graphical user interface element visible on the digital map.
Figure 17B:
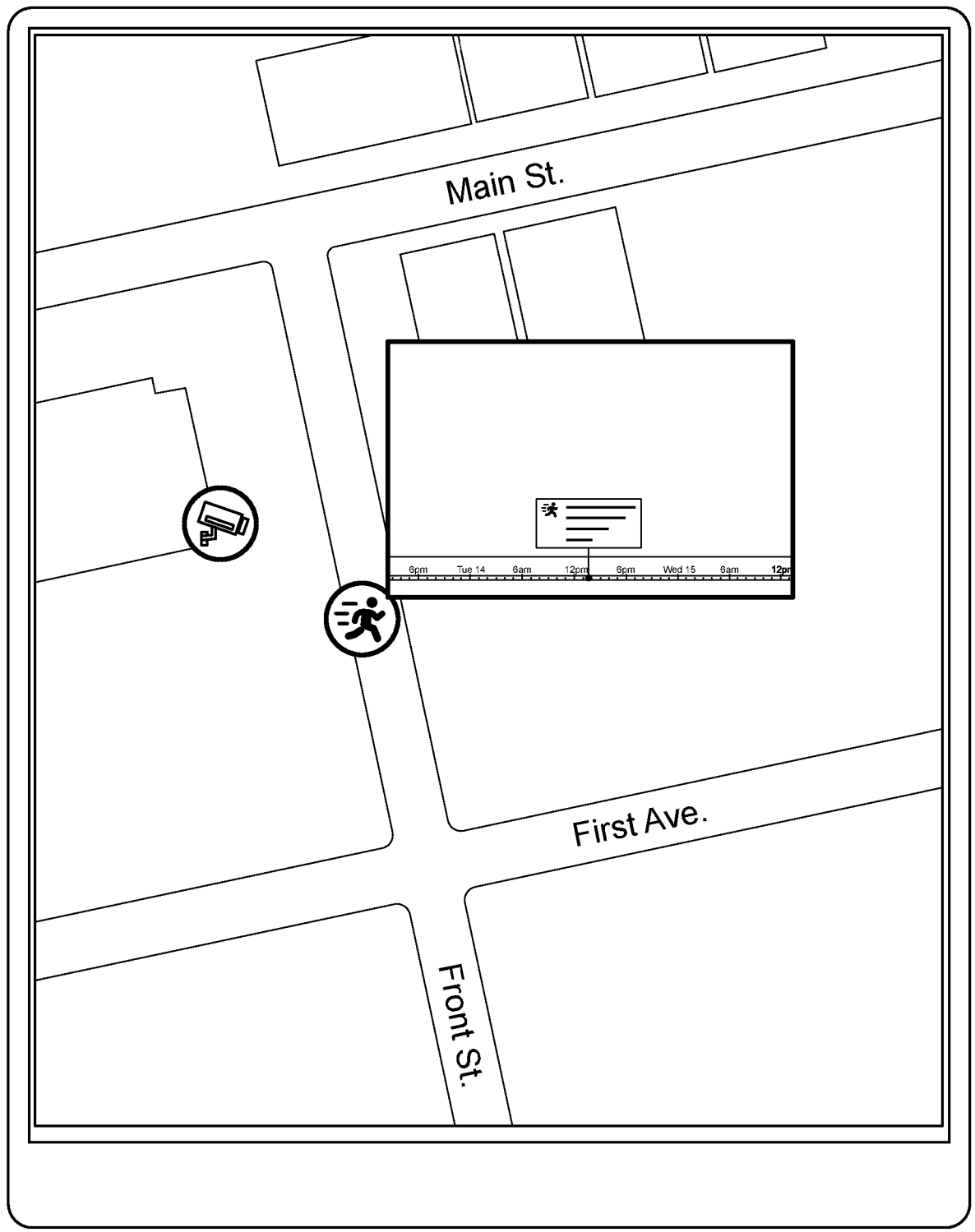
FIG. 17B is a drawing of an exemplary graphical user interface displaying a digital map, showing a second position of the seventh transitional sequence illustrating a video feed appearing next to a graphical user interface element and related to the graphical user interface element following a selection of the graphical user interface element, the video feed corresponding to the graphical user interface element displayed on the digital map next to the selected graphical user interface element, the video feed showing a graphical user interface element corresponding to the event of the selected graphical user interface element on the digital map.

In some instances, the video feed may appear as a small window or as a pop-up or thumbnail next to the first graphical user interface element displayed on the digital map, as illustrated by the sequence of states of the graphical user interface of FIGS. 17A-17B. This may occur when user input within the graphical user interface element corresponding to the event is received. The video feed may be visible as long as the first graphical user interface element is visible on the digital map. Receiving selection input of the video feed may cause the video feed (and the video progress indicator) to enlarge on the graphical user interface (in some examples, occupying the entire graphical user interface).

Figure 18A:
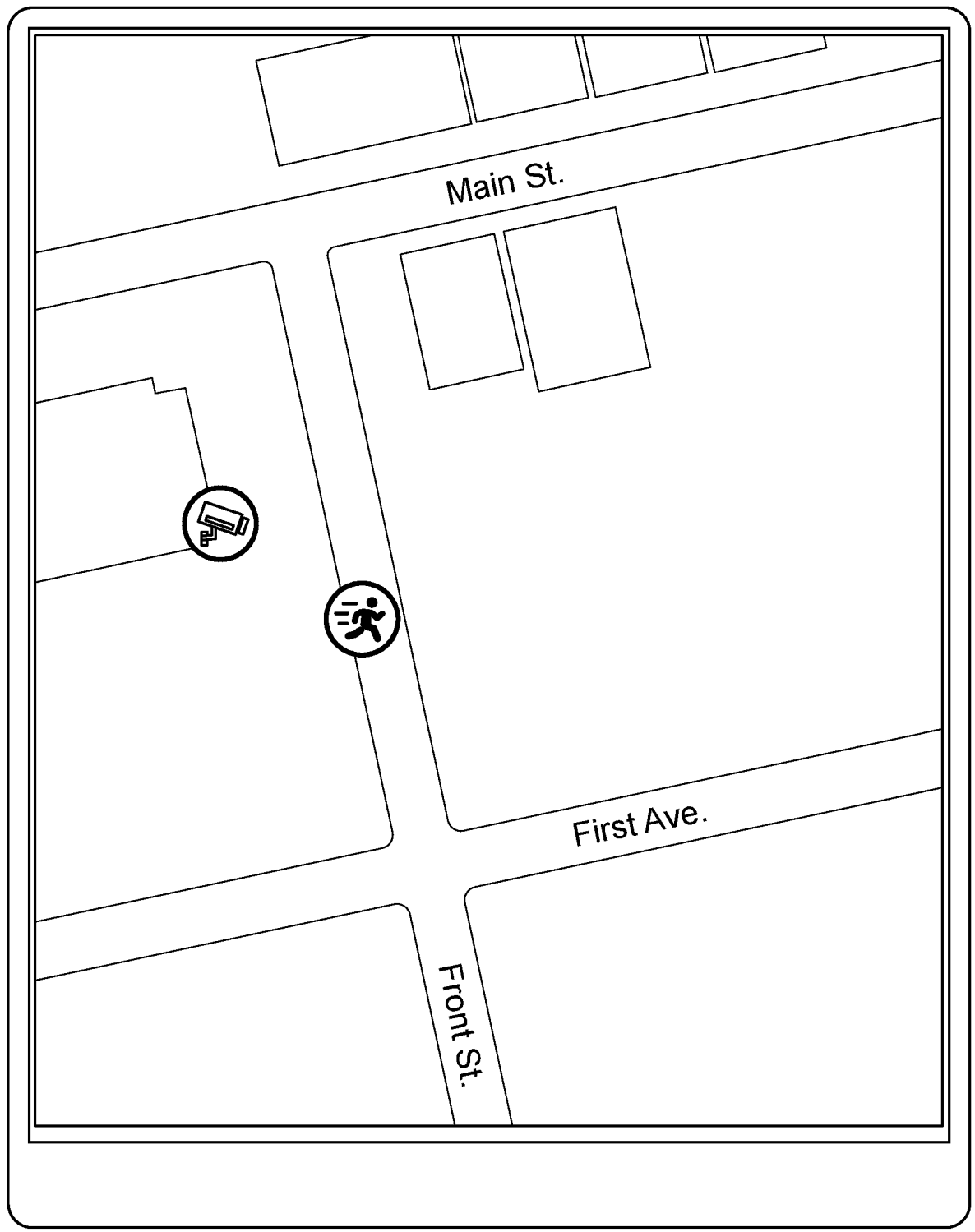
FIG. 18A is a drawing of an exemplary graphical user interface displaying a digital map, showing a first position of an eighth transitional sequence illustrating a video feed appearing next to a camera graphical user interface element and generated by the camera corresponding to the camera graphical user interface element following a selection of the camera graphical user interface element, the camera graphical user interface element visible on the digital map.
Figure 18B:
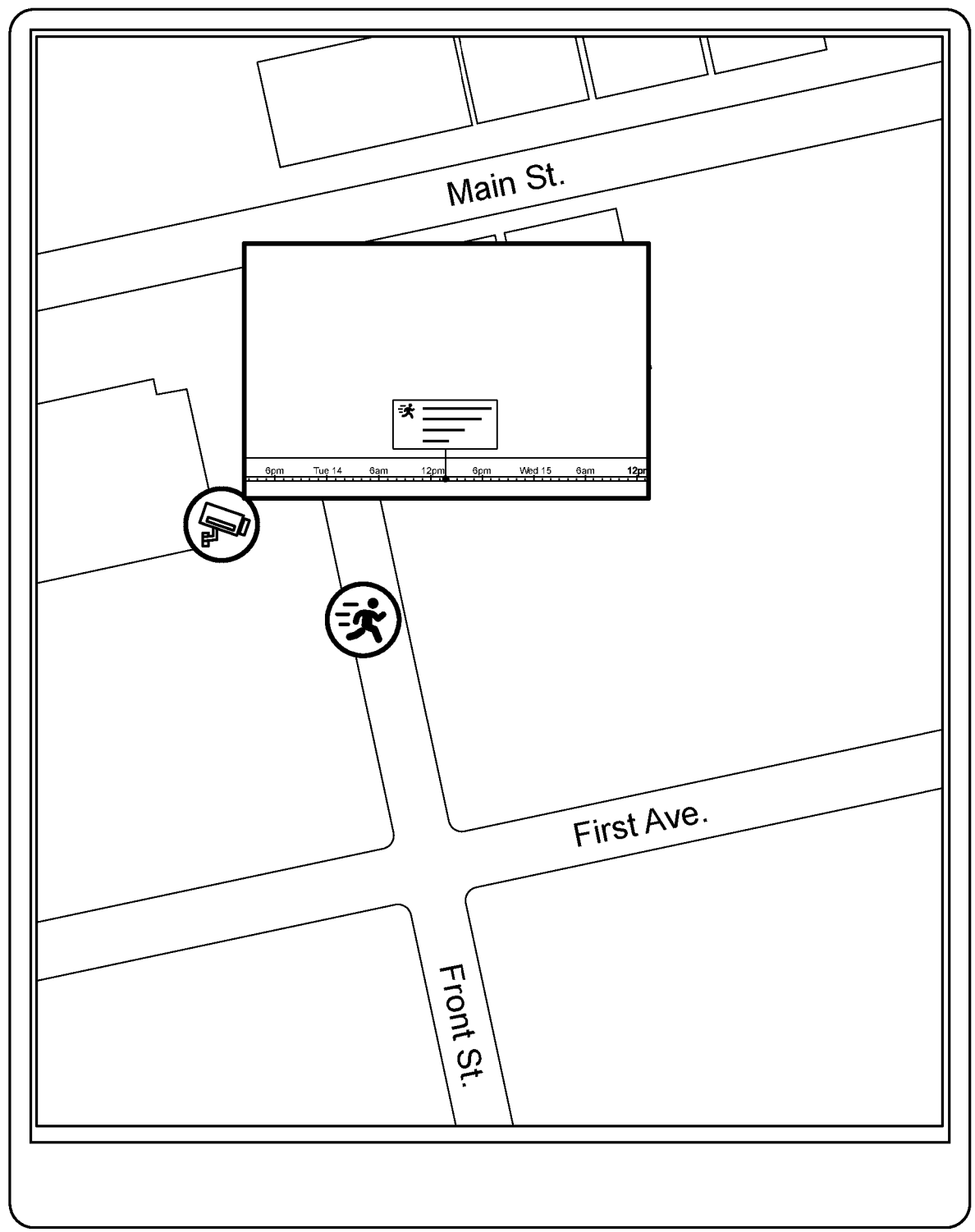
FIG. 18B is a drawing of an exemplary graphical user interface displaying a digital map, showing a second position of the eighth transitional sequence illustrating a video feed appearing next to a camera graphical user interface element and generated by the camera corresponding to the camera graphical user interface element following a selection of the camera graphical user interface element, the camera graphical user interface element visible on the digital map, the video feed generated by the camera appearing next to the selected camera graphical user interface element on the digital map.

In some instances, the video feed may appear as a small window or as a pop-up or thumbnail next to the camera graphical user interface element displayed on the digital map, as illustrated by the sequence of states of the graphical user interface of FIGS. 18A-18B. This may occur when user input within the graphical user interface element corresponding to the camera is received.

In some instances, a digital map may be permanently visible on the graphical user interface (e.g. as a thumbnail or in small), despite the display of the video feed and of the video progress indicator, where the prompt to display the second graphical user interface element results in a reduction of the space occupied by the digital map, the resolution of and quantity of information presented on the digital map decreasing following the reduction of the dimensions of the digital map on the graphical user interface.

In some embodiments, user input may be received within the second graphical user interface element, selecting the second graphical user interface element at step 560. The user input may be provided using one or more I/O devices, such as a mouse, a touchscreen, a keyboard, a microphone, a motion sensor, etc. The user input may include, but is not limited to, a button-press of a mouse, a button-press of a keyboard, a press on a touchscreen, a voice command captured by a microphone, a motion captured by a motion sensor leading to a selection of a video stream tile, eye motion captured by a vision tracker directed towards the selected video stream tile, or a combination thereof. In some instances, the user input may be moving a cursor over, or hovering over, the second graphical user interface element. In some instances, the user input may be a selection of the event indicator of the second graphical user interface element.

In other embodiments, no user input may be received, where the displaying of the video feed and the video progress indicator is instead triggered by the passing of time calculated from the display of the first graphical user interface element, or the second graphical user interface, on the graphical user interface. The digital map may be displayed again after the lapse of a period of time following the displaying of the second graphical user interface element.

Figure 11A:
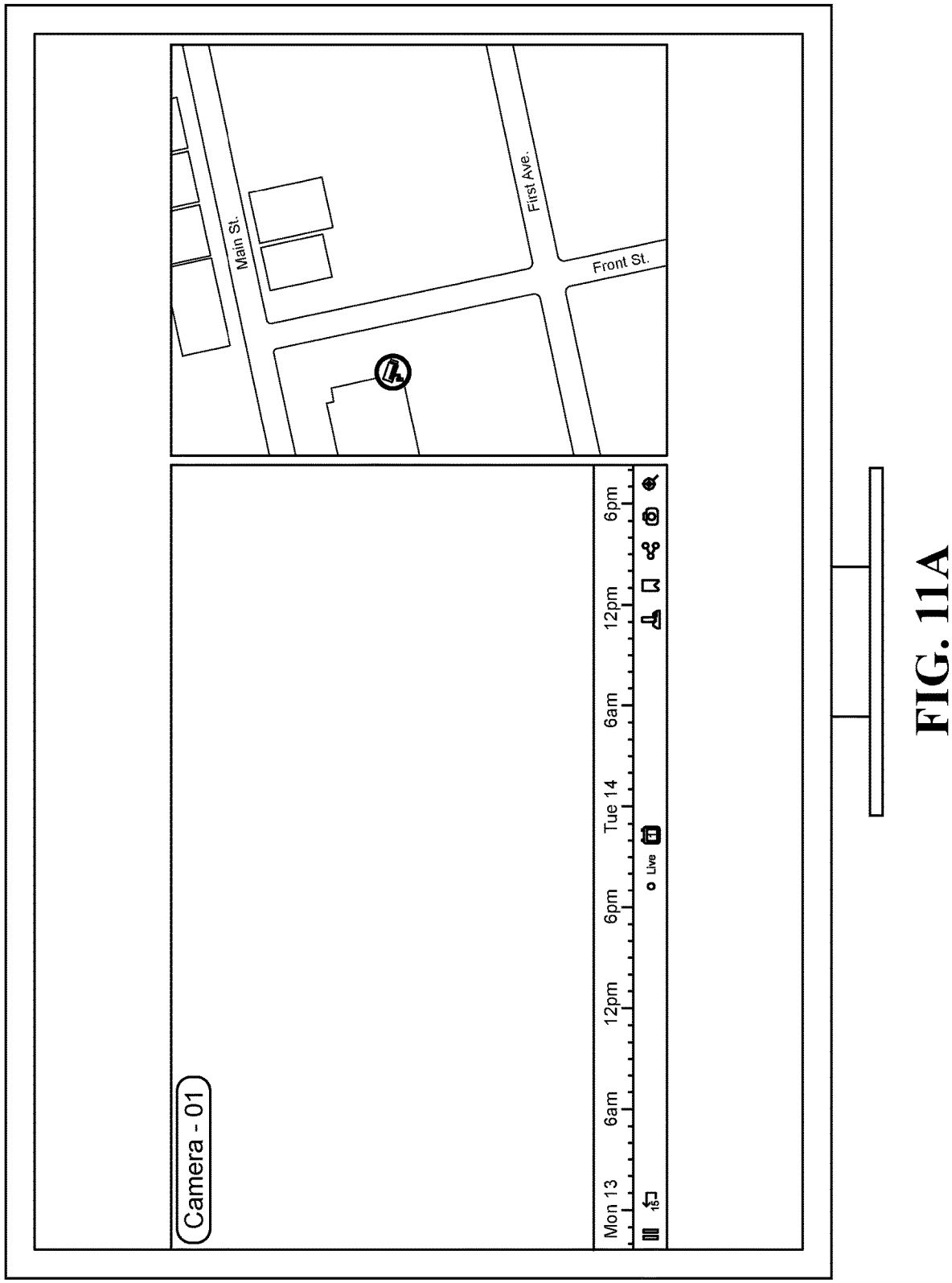
FIG. 11A is a drawing of an exemplary graphical user interface displaying a video feed next to a digital map, showing a first position of a second transitional sequence illustrating a graphical user interface element displayed on a digital map before the video feed, a graphical user interface element not yet visible on the digital map or with respect to the video feed.
Figure 11B:
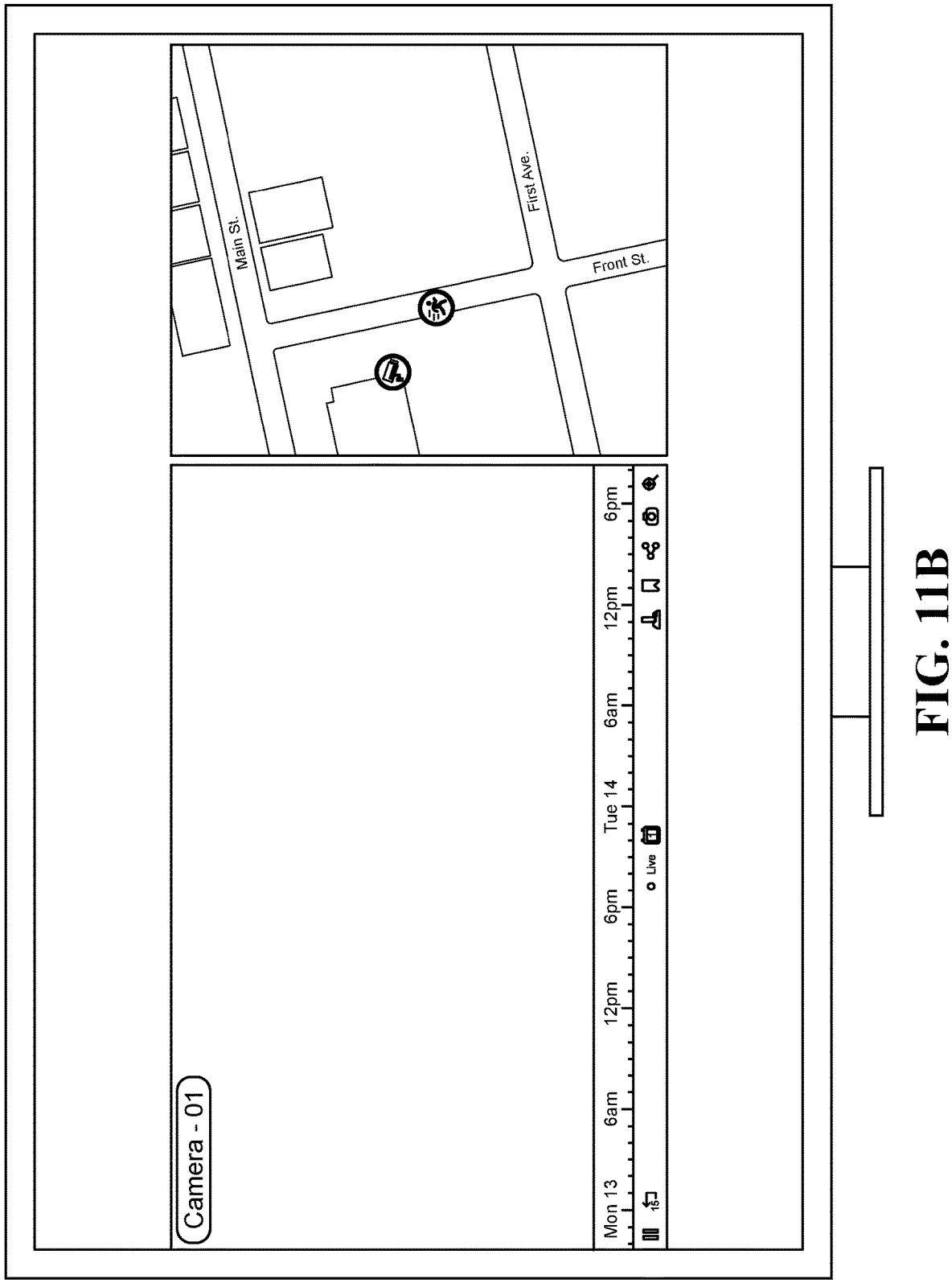
FIG. 11B is a drawing of an exemplary graphical user interface displaying a video feed next to a digital map, showing a second position of the second transitional sequence illustrating a graphical user interface element displayed on a digital map before the video feed, a graphical user interface element visible on the digital map but not yet with respect to the video feed.
Figure 11C:
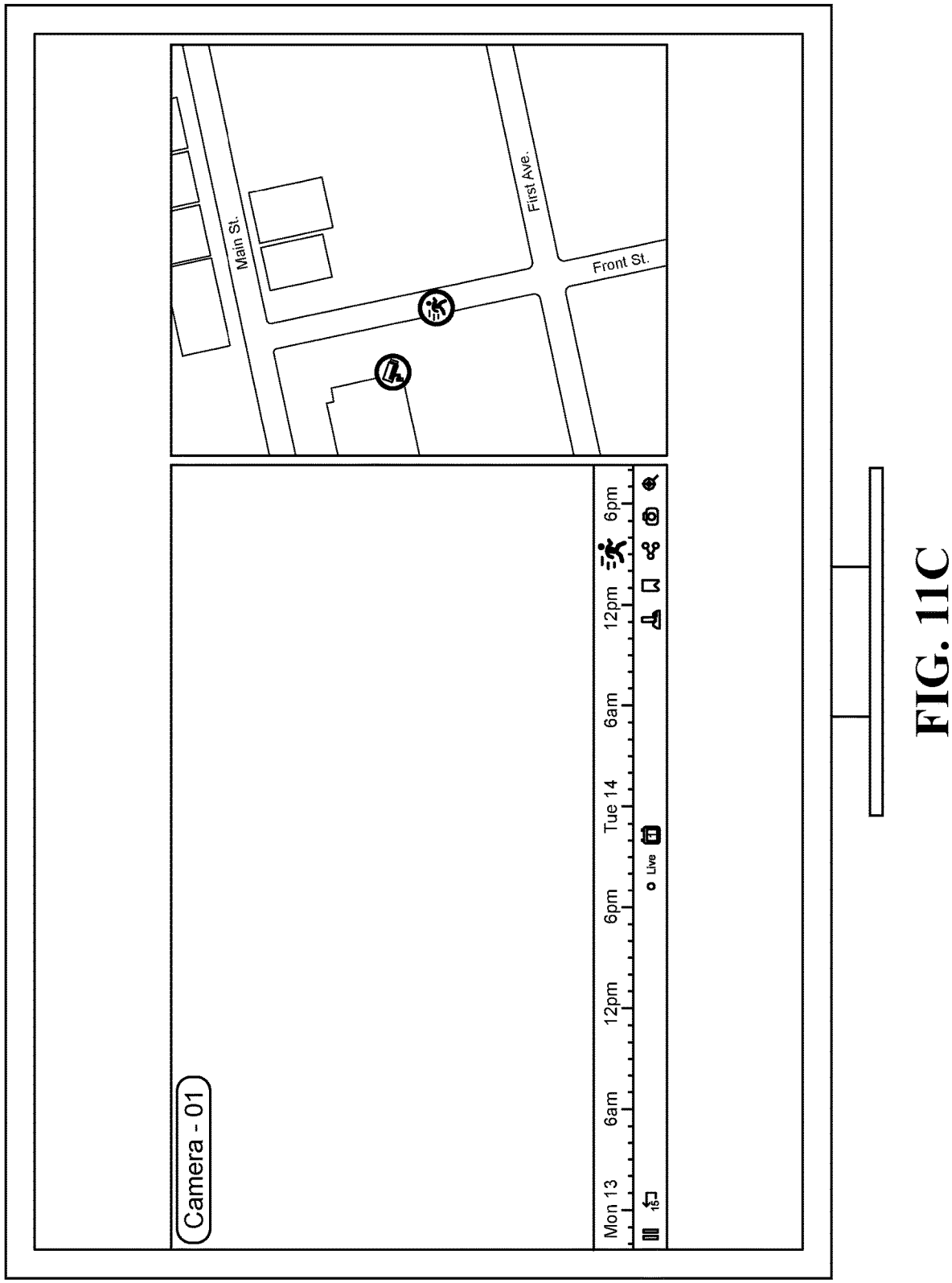
FIG. 11C is a drawing of an exemplary graphical user interface displaying a video feed next to a digital map, showing a third position of the second transitional sequence illustrating a graphical user interface element displayed on a digital map before the video feed, a graphical user interface element visible on the digital map and with respect to the video feed.

The digital map is then displayed on the graphical user interface at step 570, following receipt of the user input at step 560. The digital map may occupy the same regions of the graphical user interface as those defined at step 510. In some examples, the digital map may occupy different regions of the graphical user interface than the space occupied by the digital map at step 510. The graphical user interface element appearing on the digital map may occur before the display of the graphical user interface element appearing with respect to the video feed, as illustrated by the sequence of states of the graphical user interface of FIGS. 11A-11C.

In some embodiments, the user input may be received to adjust the dimensions of the first region, the second region and/or the space occupied by the digital map (e.g. by receiving selecting and dragging user input for one of the corners of first region, the second region and/or the space occupied by the digital map).

It will be understood that combinations of methods 400 and 500 may be used, depending on the components that are displayed on the graphical user interface—either the video feed and the video progress indicator, or the digital map). In other words, method 400 may be performed, resulting in a display of the digital map (without optional steps 470 and 480), and then method 500 may be performed subsequently from the digital map displayed as a result of step 450, resulting in the display of a video feed and of a video progress indicator, following step 550 (without optional steps 560 and 570).

In some embodiments, the displaying of the first graphical user interface element at step 510 and the displaying of the second graphical user interface at step 550 may occur simultaneously (where no user input is required to cause the displaying of the second graphical user interface element at step 550).

In some instances, the period during which the first graphical user interface element and the second graphical user interface are displayed corresponds to a duration of the event associated with the first graphical user interface element and the second graphical user interface (when the event has a start time and a finish time, as provided in data related to the event).

In some instances, the displaying of the first graphical user interface element at step 510 and/or the displaying of the second graphical user interface at step 550 may occur at a predetermined time prior to the occurrence of the event.

In some embodiments, the method 500 may further include the removal of the first graphical user interface element and of the second graphical user interface element following the lapse of a period following the display of the first graphical user interface element or the second graphical user interface element, or the occurrence or the end of the event corresponding to the first graphical user interface element or the second graphical user interface element.

Figure 16A:
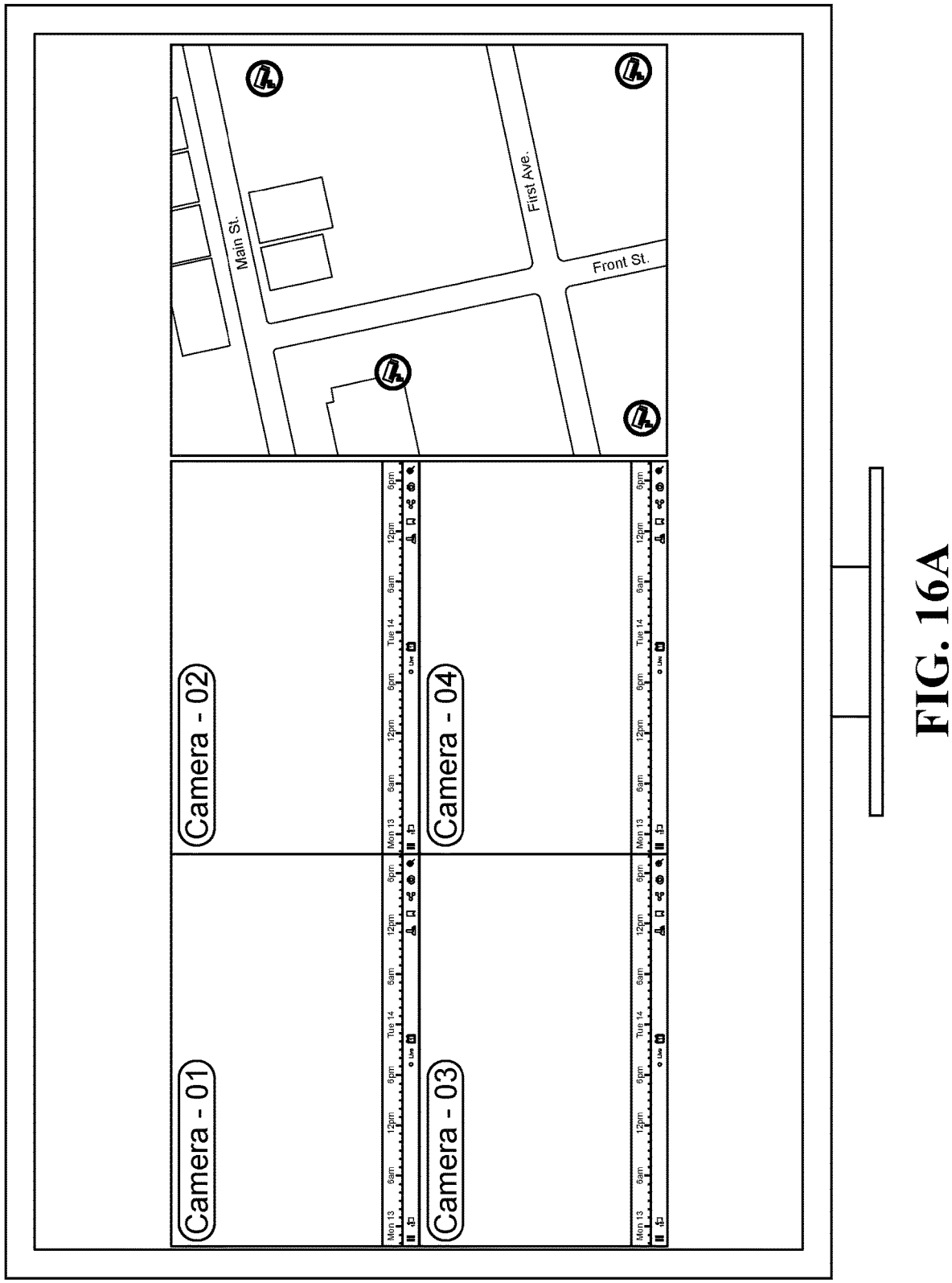
FIG. 16A is a drawing of an exemplary graphical user interface displaying four video feeds and a digital map, where each video feed is generated by a camera with a camera graphical user interface element appearing on the digital map.
Figure 16B:
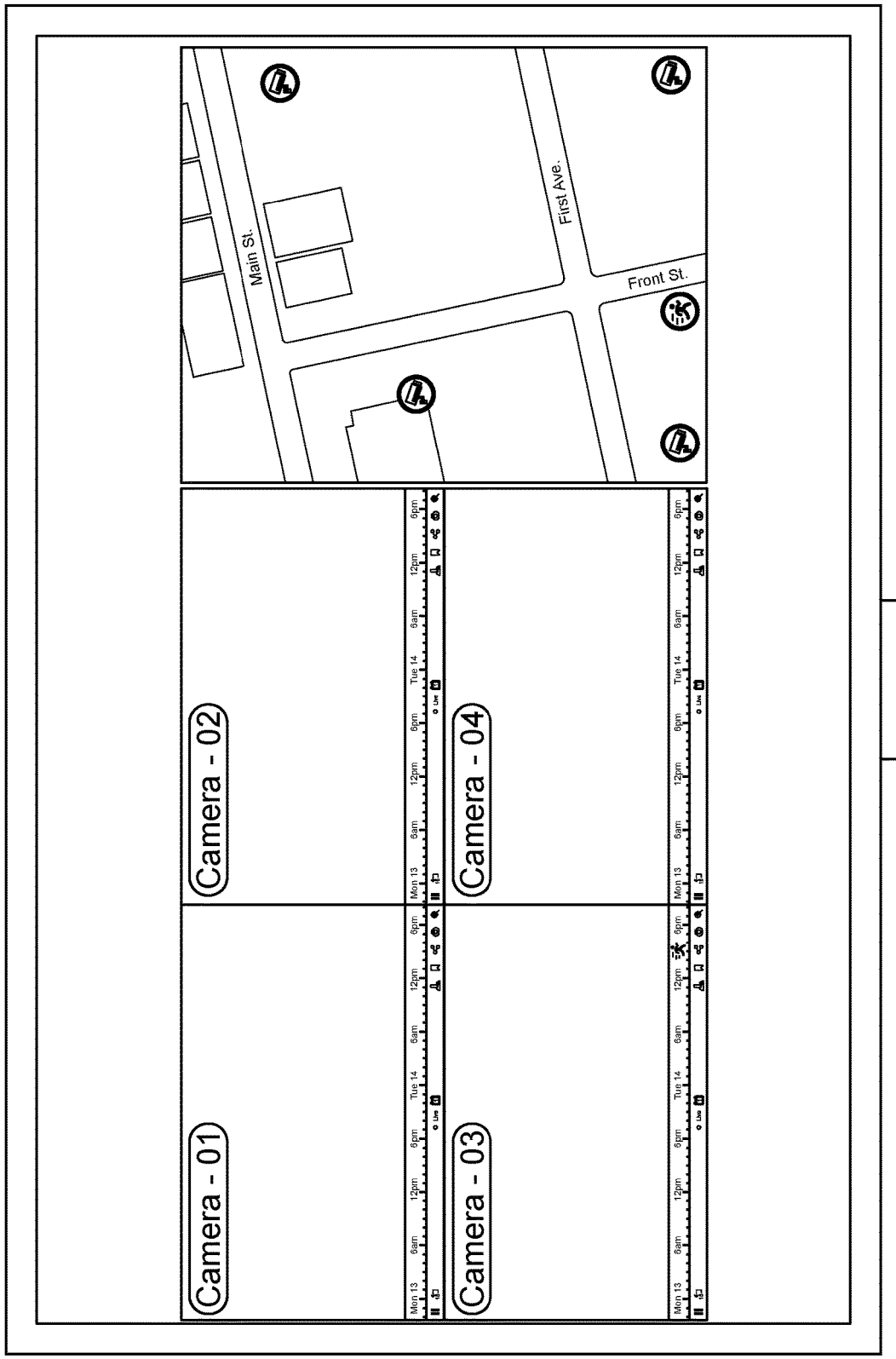
FIG. 16B is a drawing of the graphical user interface of FIG. 16A with a first graphical user interface element of an event appearing on a video feed generated by the camera related to the event, the first graphical user interface element also appearing on the digital map next to the camera graphical user interface element of the camera related to the first event.
Figure 16C:
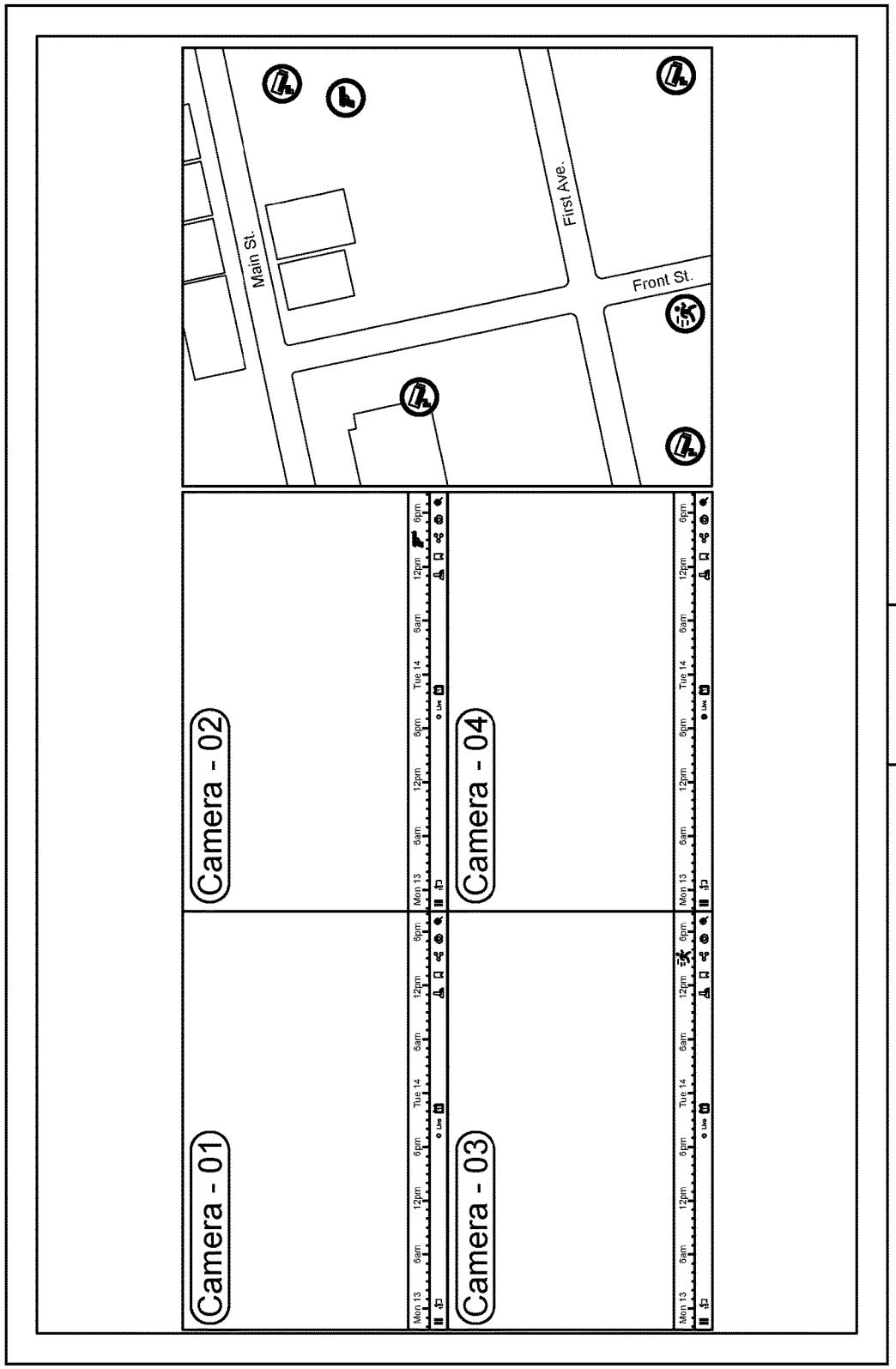
FIG. 16C is a drawing of the graphical user interface element of FIG. 16B with a second graphical user interface element of a second event appearing on a different video feed generated by the camera related to the second event, the second graphical user interface element also appearing on the digital map next to the camera graphical user interface element of the camera related to the second event.

In some instances, multiple video feeds may be visible on the graphical user interface, where one or more graphical user interface elements related to a video feed may be visible with respect to that video feed. The video feeds may be generated by cameras with locations contained within a geographical area appearing on a digital map. The graphical user interface elements appearing on the digital map are those related to the video feeds displayed on the graphical user interface. As a result, more than one of the video feeds may display a graphical user interface element (different graphical user interface elements for at least some of the video feeds; or some video feeds may share a common graphical user interface element when e.g. the corresponding event is associated with the corresponding cameras), and the corresponding graphical user interface elements may appear on the digital map, as illustrated by the sequence of states of the graphical user interface of FIGS. 16A-16C.

Figure 7:
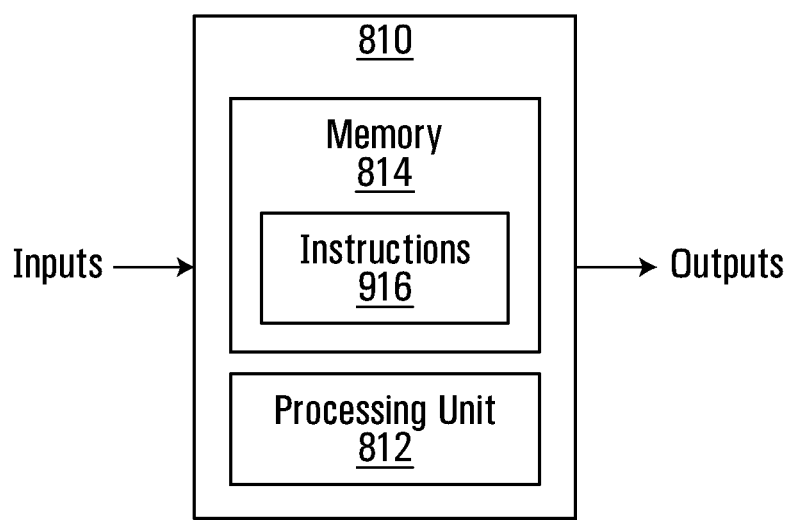
FIG. 7 is a block diagram of an exemplary computing device.

With reference to FIG. 7, the methods of the present disclosure may be implemented by one or more computing devices, such as a computing device 810 comprising a processing unit 812 and a memory 814 which has stored therein computer-executable instructions 916. Each of the system 106 and the client computing device 110 may each be implemented by and/or comprise at least one computing device, such as the computing device 810.

The processing unit 812 may comprise any suitable devices configured to implement the methods such that instructions 916, when executed by the computing device 110 or other as described herein to be executed. The processing unit 812 may comprise, for example, any type of general-purpose microprocessor or microcontroller, a digital signal processing (DSP) processor, a central processing unit (CPU), a graphical processing unit (GPU), an integrated circuit, a field programmable gate array (FPGA), a reconfigurable processor, other suitably programmed or programmable logic circuits, or any combination thereof. The processing unit 712 may be referred to as a "processor".

The memory 814 may comprise any suitable known or other machine-readable storage medium. The memory 814 may comprise non-transitory computer readable storage medium, for example, but not limited to, an electronic, magnetic, optical, electromagnetic, infrared, or semiconductor system, apparatus, or device, or any suitable combination of the foregoing. The memory 814 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 814 may include any storage means (e.g., devices) suitable for retrievably storing machine-readable instructions 916 executable by processing unit 812.

The methods and systems described herein may be implemented in a high-level procedural or object-oriented programming or scripting language, or a combination thereof, to communicate with or assist in the operation of a computer system, for example the computing device 810. Alternatively, the methods and systems described herein may be implemented in assembly or machine language. The language may be a compiled or interpreted language. Program code for implementing the methods and systems described herein may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems described herein may also be considered to be implemented by way of a non-transitory computer-readable storage medium having a computer program stored thereon. The computer program may comprise computer-readable instructions which cause a computer, or in some embodiments the processing unit 812 of the computing device 810, to operate in a specific and predefined manner to perform the functions described herein.

Computer-executable instructions may be in many forms, including program modules, executed by one or more computers or other devices. Generally, program modules include routines, programs, objects, components, data structures, etc., that perform particular tasks or implement particular abstract data types. Typically, the functionality of the program modules may be combined or distributed as desired in various embodiments.

Although the invention has been described with reference to preferred embodiments, it is to be understood that modifications may be resorted to as will be apparent to those skilled in the art. Such modifications and variations are to be considered within the purview and scope of the present invention.

Representative, non-limiting examples of the present invention were described above in detail with reference to the attached drawing. This detailed description is merely intended to teach a person of skill in the art further details for practicing preferred aspects of the present teachings and is not intended to limit the scope of the invention. Furthermore, each of the additional features and teachings disclosed above and below may be utilized separately or in conjunction with other features and teachings.

Moreover, combinations of features and steps disclosed in the above detailed description, as well as in the experimental examples, may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

What is claimed is:

1. A method of rendering a digital map within a graphical user interface displayed in association with a video feed, the method comprising:
   receiving a video feed comprising a plurality of image frames captured by a camera;
   rendering the video feed and a video progress indicator associated with the video feed on the graphical user interface displayed on a display device of a computing device;
   displaying, on at least one of the video feed and the video progress indicator, a first graphical user interface element indicative of an occurrence of an event associated with a geographical location, the first graphical user interface element positioned at a location within the graphical user interface indicative of a time of the occurrence of the event, the first graphical user interface element comprising a first icon representative of an event type of the event;
   rendering, on the graphical user interface by the computing device, the digital map; and
   displaying, in time-dependent correspondence with the displaying of the first icon of the first graphical user interface element, a second graphical user interface element on the digital map, the second graphical user interface element comprising a second icon representative of the event type of the event, the second graphical user interface element displayed at a position on the digital map corresponding to the geographical location associated with the event, wherein a time of appearance of the second graphical user interface element on the digital map and a time of subsequent removal of the second graphical user interface element from the digital map is related to a time period of visibility of the first icon of the first graphical user interface element on the at least one of the video feed and the video progress indicator.

2. The method of claim 1, further comprising:
   receiving an input within the first user interface element while the first user interface element is displayed on at least one of the video feed and the video progress indicator, and displaying the digital map with the second graphical user interface element in response to receiving the input within the first user interface element.

3. The method as defined in claim 2, wherein the input is a first input, and the method further comprises:
receiving a second input within the second graphical user interface element displayed on the digital map; and
following the second input being received, displaying the video feed by the computing device on the graphical user interface appearing on the display device to playback the video stream at the time of the occurrence of the event.

4. The method as defined in claim 2, wherein the input includes hovering over the first graphical user interface element with a cursor of an input device.

5. The method as defined in claim 2, wherein the input includes a button press selection of the first user interface element via an input device.

6. The method as defined in claim 1, further comprising:
receiving an input within the second user interface element while the second user interface element is displayed on the digital map, and displaying the video feed and the video progress indicator associated with the video feed in response to receiving the input within the second user interface element.

7. The method as defined in claim 6, wherein the input is a first input, the method further comprises:
receiving a second input within the first graphical user interface element; and
following the second input being received, displaying, on the graphical user interface generated on the display device of the computing device, the digital map and the second graphical user interface element.

8. The method as defined in claim 1, further comprising rendering, on the graphical user interface by the computing device, a third graphical user interface element on the digital map, the third graphical user interface element indicative of the camera, the second graphical user interface element and the third graphical user interface element positioned on the digital map to indicate the positional relationship between the camera corresponding to the video feed and the occurrence of the event.

9. The method as defined in claim 8, wherein the method further comprises:
receiving input of the third graphical user interface element appearing on the digital map;
receiving the video feed of the camera associated with the third graphical user interface element; and
displaying, on the graphical user interface generated on the display device of the computing device, a live video feed of the camera associated with the third graphical user interface element.

10. The method as defined in claim 8, wherein the third graphical user interface element is an icon of a camera.

11. The method as defined in claim 1, wherein the video feed is displayed in a first region of the graphical user interface; and the video progress indicator appears in a second region of the graphical user interface, and wherein the digital map is rendered in a first sub-region of the first region, wherein the first sub-region is smaller than the first region.

12. The method as defined in claim 11, wherein the first icon of the first graphical user interface element appears on the video progress indicator at a position of the video progress indicator corresponding to the time of the occurrence of the event.

13. The method as defined in claim 11, wherein the first graphical user interface element is a pop-up element occupying at least in part a portion of the first region of the graphical user interface, the pop-up element displayed in correspondence with the time of the occurrence of the event.

14. The method as defined in claim 1, wherein the video feed is displayed in a first region of the graphical user interface; and the video progress indicator appears in a second region of the graphical user interface, and wherein the digital map is displayed in a third region of the graphical user interface separate from the first region and the second region.

15. The method as defined in claim 1, wherein the video feed is displayed in a first region of the graphical user interface; and the video progress indicator appears in a second region of the graphical user interface, and wherein the digital map occupies at least the first region and the second region, and the video feed and the video progress indicator are occluded by the digital map.

16. The method as defined in claim 1, further comprising:
identifying, from a plurality of event types, the event type associated with the event and choosing from a list of options the first icon and the second icon based on the event type as identified.

17. The method as defined in claim 1, wherein the geographical location is a location of the occurrence of the event.

18. The method as defined in claim 1, wherein the geographical location is a location of the camera that captured the plurality of image frames of the video feed.

19. The method as defined in claim 1, wherein the video feed is a recorded video feed, and wherein the first graphical user interface element is displayed in response to detecting that the time of the occurrence of the event is within a pre-determined timeframe of a current playback time of the recorded video feed.

20. The method as defined in claim 1, wherein the first icon has a same appearance as the second icon.

21. The method as defined in claim 1, wherein the video feed is a live video feed, and wherein the first graphical user interface element is displayed in response to detecting, in real-time and based on an event occurrence record being obtained from a data source, the occurrence of the event.

22. The method as defined in claim 1, wherein the first graphical user interface element and the second graphical user interface element are displayed at a same time on the graphical user interface corresponding to the time of the occurrence of the event.

23. The method as defined in claim 1, wherein one of the first graphical user interface element and the second graphical user interface element is displayed before another of the first graphical user interface element and the second graphical user interface element, and wherein a period during which the first graphical user interface element is displayed overlaps with a period during which the second graphical user interface element is displayed, wherein the period during which the first graphical user interface element is displayed and the period during which the second graphical user interface element is displayed correspond to the time of the occurrence of the event.

24. The method as defined in claim 1 wherein the first graphical user interface element and the second graphical user interface element are displayed at a predetermined time prior to the time of the occurrence of the event.

25. The method as defined in claim 1, further comprising:
removing the first graphical user interface element and the second graphical user interface element following a lapse of a predetermined time from the time of the occurrence of the event.

26. The method as defined in claim 1, further comprising:
receiving an input within a third user interface element indicative of a camera and appearing on the digital map, and displaying the video feed and the video progress indicator associated with the video feed in response to receiving the input within the third user interface element.

\* \* \* \* \*